US009129410B2

(12) United States Patent
Nakamura

(10) Patent No.: US 9,129,410 B2
(45) Date of Patent: *Sep. 8, 2015

(54) IMAGE PROCESSING APPARATUS AND PIXEL INTERPOLATION METHOD

(71) Applicant: RICOH COMPANY, LTD., Ohta-ku (JP)

(72) Inventor: Satoshi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 31 days.

This patent is subject to a terminal disclaimer.

(21) Appl. No.: 14/156,141

(22) Filed: Jan. 15, 2014

(65) Prior Publication Data
US 2014/0126840 A1    May 8, 2014

Related U.S. Application Data

(63) Continuation of application No. 13/352,993, filed on Jan. 18, 2012, now Pat. No. 8,666,171.

(30) Foreign Application Priority Data

Jan. 21, 2011    (JP) .................................. 2011-010762

(51) Int. Cl.
G06K 9/46      (2006.01)
G06T 3/40      (2006.01)
H04N 1/409     (2006.01)

(52) U.S. Cl.
CPC ............ G06T 3/4007 (2013.01); H04N 1/4097 (2013.01)

(58) Field of Classification Search
None
See application file for complete search history.

(56) References Cited

U.S. PATENT DOCUMENTS 6,381,365 B2    4/2002  Murakawa
7,200,286 B2    4/2007  Matsumoto
7,738,738 B2    6/2010  Yamanaka et al.
(Continued)

FOREIGN PATENT DOCUMENTS

CN    1531329 A    9/2004
CN    1723690 A    1/2006
(Continued)

OTHER PUBLICATIONS

Japanese Office Action issued Sep. 30, 2014, in Japan Patent Application No. 2011-010762.
(Continued)

Primary Examiner — Li Liu
(74) Attorney, Agent, or Firm — Oblon, McClelland, Maier & Neustadt, L.L.P.

(57) ABSTRACT

A periodicity determining unit determines whether an image region including a target pixel is a periodic region in which pixel values vary periodically. A first generating unit generates a pixel value using a first interpolation method. A second generating unit generates a pixel value using a second interpolation method. A control unit determines, based on the determination result of the periodicity determining unit, which one of the first and second generating units is to be used for generating a pixel value of the target pixel. A pixel value inserting unit inserts the generated pixel value to the target pixel. The periodicity determining unit includes a cycle estimating unit to estimate, using pixel values of pixels within the image region, a variation cycle of the pixel values, and/or a determining unit to determine whether each region positioned at left and right sides of the target pixel is the periodic region.

12 Claims, 20 Drawing Sheets

(56) References Cited

U.S. PATENT DOCUMENTS

| | | |
|---|---|---|
| 8,625,892 B2 | 1/2014 | Nakamura |
| 2002/0015162 A1 | 2/2002 | Hoshii et al. |
| 2005/0007611 A1 | 1/2005 | Matsukubo et al. |
| 2006/0050990 A1 | 3/2006 | Yamanaka et al. |
| 2007/0121179 A1 | 5/2007 | Yoshida et al. |
| 2009/0141310 A1 | 6/2009 | Matsuoka |
| 2009/0213429 A1 | 8/2009 | Miyagi |

FOREIGN PATENT DOCUMENTS

| | | |
|---|---|---|
| CN | 1879126 A | 12/2006 |
| CN | 101350187 A | 1/2009 |
| JP | 11-85982 | 3/1999 |
| JP | 2005-208739 | 8/2005 |
| JP | 4330164 | 6/2009 |
| JP | 2010-178174 | 8/2010 |

OTHER PUBLICATIONS

The Extended European Search Report issued Jul. 2, 2014, in Application No. / Patent No. 12151413.7-1903 /2479974.

Chinese Office Action issued Apr. 1, 2014, in China Patent Application No. 201210044979.3 (with English translation).

U.S. Appl. No. 14/096,543, filed Dec. 4, 2013, Nakamura.

U.S. Appl. No. 14/096,543, filed Dec. 4, 2013.

FIG.5A
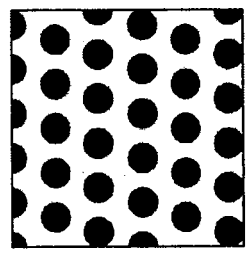 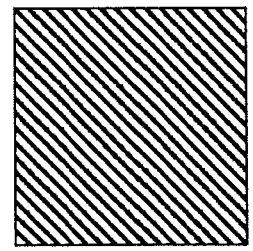
FIG.5B
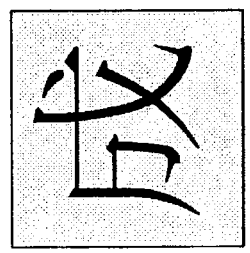 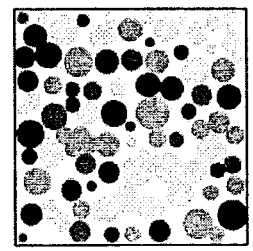
FIG.5C
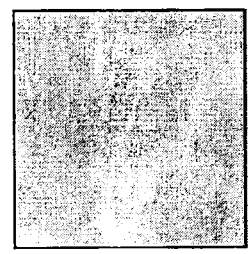 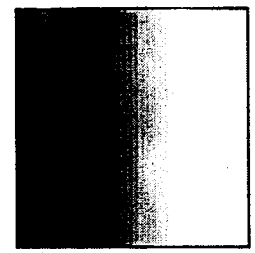

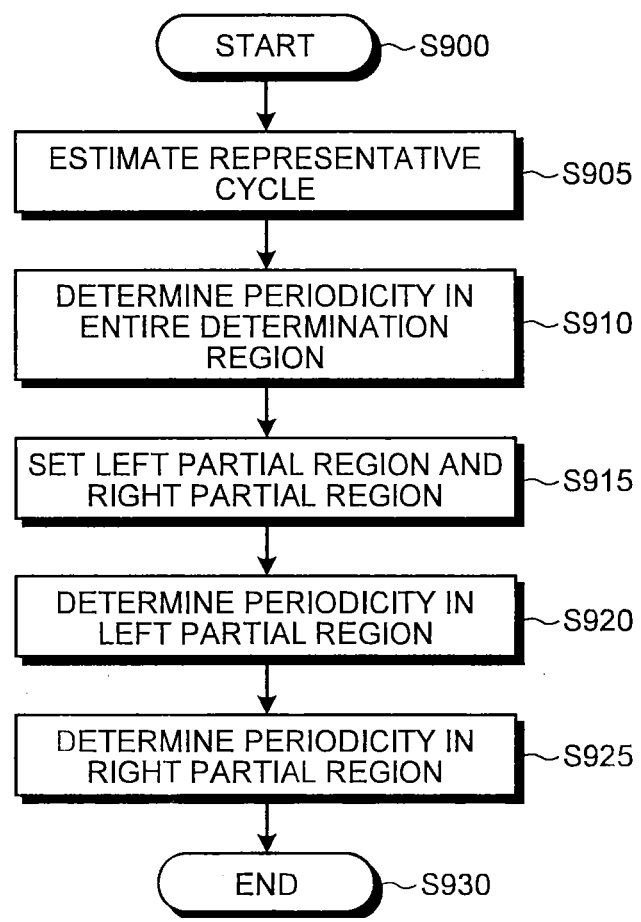

IMAGE PROCESSING APPARATUS AND PIXEL INTERPOLATION METHOD

CROSS-REFERENCE TO RELATED APPLICATIONS

This application is a continuation of and claims the benefit of priority from U.S. Ser. No. 13/352,993, filed Jan. 18, 2012, which claims the benefit of priority from Japanese Patent Application No. 2011-010762, filed Jan. 21, 2011, the entire contents of each of which are incorporated herein by reference.

BACKGROUND OF THE INVENTION

1. Field of the Invention

The present invention relates to an apparatus that performs an interpolation process in order to interpolate a pixel value for a pixel having a missing pixel value or an incorrect pixel value in an image, and a pixel interpolation method performed by the device.

2. Description of the Related Art

A scanner device that scans images using an optical unit is classified into a device that employs a contact image sensor (CIS) and a device that employs a charge coupled device (CCD). The scanner device employing the CIS is unable to scan a stereoscopic document since the document needs to be in close contact with a surface to be scanned. However, in recent years, the device employing the CIS has been in wide use due to its thin body and an inexpensive cost as compared to the device employing the CCD as well as an improvement in the technique of reducing noise that is likely to occur in a scanned image. For example, the CIS is used in an image scanner having a one-pass duplex scanning function in order to scan the rear surface of a document.

The CIS uses RGB light emitting diodes (LEDs) as a light source, emits R, G, and B color lights to a document by switching them at a high speed, and inputs the reflected lights from the document to an imaging element (CMOS image sensor) through a lens. The CMOS image sensor converts the lights input from the document into voltage values pixel by pixel and outputs the converted voltage values.

The scanner device employing the CIS employs a contact image sensor type in which a document is brought into close contact with a sensor using a roller and the document is scanned line by line. It is difficult to manufacture a single long CIS, and thus, a scanning unit of the CIS is formed by arranging a plurality of short sensors is arranged in their longitudinal directions. However, in this configuration, since a certain gap is formed between the sensors, an image signal in this gap may not be acquired. As a result, a deficiency in the image signal occurs.

In a scanner device, the image signal may become deficient or the scanned image signal may have an incorrect value due to a defect of a sensor scanning the image signal or due to the presence of an obstacle in the midway of an optical path such as dust present on a contact glass on which a document is set.

As a result, there is a problem in that a pixel having a missing pixel value or an incorrect pixel value is present in a scanned image, and the image quality deteriorates. To solve this problem, in the related art, there is known a method of estimating a correct pixel value of a target pixel having a missing or incorrect pixel value from pixel values of the surrounding pixels thereof and interpolating (inserting) the estimated pixel value instead of the missing or incorrect pixel value of the target pixel.

For example, a method of performing linear interpolation using the pixel values of the surrounding pixels of a target pixel; and a method of performing polynomial interpolation or spline interpolation using a function of the second order or higher are known. The interpolation method based on linear interpolation is ideal for interpolation at portions of an image having a small change in density but is not ideal for interpolation at portions of an image having a severe change in density like a halftone dot region.

The interpolating method based on polynomial interpolation and spline interpolation can estimate pixel values with high accuracy when the sampling cycle for sampling an image such as a digital photograph is sufficiently shorter than the variation cycle of the image pattern. However, in the case of halftone dot images, since the image resolution is not sufficient as compared to the number of lines of halftone dots, the sampling period is not sufficient in relation to the variation period of the image. Thus, the interpolating method may be unable to reproduce the original pattern correctly.

Thus, in order to solve the problem of the interpolating method, a method which uses pattern matching has been proposed. In this pattern matching method, it is expected that high-frequency components which could not be reproduced by the interpolating method can be reproduced using similar patterns in the vicinity of the interpolation target pixel.

However, in general, since the pattern matching uses a large range of information as compared to the interpolating method, although the optimum solution to a base pattern is obtained, the obtained solution is not said to be optimum to the interpolation target pixel. This problem happens because when searching for similar patterns in the pattern matching method, patterns which are slightly different from each other as a whole are not distinguished from patterns which are mostly identical but partly greatly different from each other.

In particular, like a halftone dot region having a high screen ruling, when information is eccentrically distributed to specific pixels, a method of selecting similar patterns has a large effect on the interpolation result. Moreover, in a halftone dot region having a low density, since the proportion of pixels belonging to the background region of an image is relatively high, similar patterns may be detected in the background region rather than the halftone dot region, or alternatively, no similar pattern may be detected.

Therefore, when performing interpolation, it is necessary to use an interpolation method depending on the characteristics of a region to which the interpolation target pixel belongs. In order to accurately estimate the pixel value of the interpolation target pixel, there has been proposed a device in which when the position of an interpolation target pixel is within a halftone dot region, patterns similar to a pattern including the interpolation target pixel are searched for from an image, and the pixel value of a pixel, which is included in the most similar pattern and corresponds to the interpolation target pixel, is determined as the pixel value of the interpolation target pixel (see Japanese Patent No. 4330164).

This device determines whether the position of an interpolation target pixel corresponding to a connecting portion of contact image sensors is within a halftone dot region or a non-halftone dot region based on the image data scanned by an image scanning sensor. When the position of the interpolation target pixel is within the non-halftone dot region, the pixel data of the interpolation target pixel are generated by means of linear interpolation, and the generated pixel data is inserted into the interpolation target pixel. On the other hand, when the position of the interpolation target pixel is within the halftone dot region, the pixel data of the interpolation target pixel are generated by means of pattern matching, and the generated pixel data is inserted into the interpolation target pixel.

In this case, one base block including the interpolation target pixel and a plurality of reference blocks having the same size as the base block but not including the interpolation target pixel are set in an image region near the position of the interpolation target pixel. Then, the correlation values between the base block and the respective reference blocks are calculated based on the pixel data within the base block and the pixel data within the respective reference blocks. Among the pixel data within a reference block having the highest correlation value with the base block, the pixel data of a pixel corresponding to the interpolation target pixel within the base block are determined as the pixel data of the interpolation target pixel.

In this interpolation method, the pixel value of the interpolation target pixel can be determined using similar patterns present around the interpolation target pixel. However, since the size of a template used in pattern matching and the range for searching for the similar patterns thereof are constant regardless of an image, there is a problem in that the interpolation accuracy decreases for patterns having a short cycle such as a halftone dot having a high screen ruling.

When a template of a halftone-dot image having a high screen ruling is set to have a fixed size, a plurality of halftone dots are included in the template. If similar patterns are searched for using that template, patterns having a high degree of coincidence with a plurality of halftone dots included in the template are selected. However, this method does not always result in the optimum result for a halftone dot including the interpolation target pixel. As a result, an interpolation result which is away from the optimum value is obtained, and image quality may decrease.

Therefore, there is a demand for a device and a method capable of dynamically determining the template size and the range to be searched to retrieve the similar patterns in accordance with the characteristics of the image and of performing an interpolation process with high accuracy with respect to patterns having a short cycle such as a halftone dot having a high screen ruling.

SUMMARY OF THE INVENTION

An image processing apparatus includes a periodicity determining unit configured to determine whether an image region including a target pixel whose pixel value is to be interpolated is a periodic region in which pixel values vary periodically; a first pixel value generating unit configured to generate a pixel value of a pixel using a first interpolation method; a second pixel value generating unit configured to generate a pixel value of a pixel using a second interpolation method different from the first interpolation method; a control unit configured to determine, based on the determination result obtained by the periodicity determining unit, which one of the first and second pixel value generating units is to be used for generating a pixel value of the target pixel; and a pixel value inserting unit configured to insert, to the target pixel, the pixel value generated by one of the first and second pixel value generating units determined by the control unit. The periodicity determining unit includes at least one of: a cycle estimating unit configured to estimate, using pixel values of respective pixels within the image region including the target pixel, a variation cycle of the pixel values; and a partial region periodicity determining unit configured to determine whether each of regions positioned at left and right sides of the target pixel is the periodic region. At least one of the first and second pixel value generating units generates the pixel value of the target pixel using at least one of the variation cycle of the pixel values estimated by the cycle estimating unit and the determination result determined by the partial region periodicity determining unit.

A pixel interpolation method is performed in an image processing apparatus that includes a first pixel value generating unit to generate a pixel value of a pixel using a first interpolation method, and a second pixel value generating unit to generate a pixel value of a pixel using a second interpolation method different from the first interpolation method. The pixel interpolation method includes determining whether an image region including a target pixel whose pixel value is to be interpolated is a periodic region in which pixel values vary periodically; determining, based on the determination result obtained in the determining of the periodicity of the image region, which one of the first and second pixel value generating units is to be used for generating a pixel value of the target pixel; and inserting, to the target pixel, the pixel value generated by one of the first and second pixel value generating units determined in the determining of the pixel value generating unit. The determining of periodicity includes at least one of: estimating, using pixel values of respective pixels within the image region including the target pixel, a variation cycle of the pixel values; and determining whether each of regions positioned at left and right sides of the target pixel is the periodic region. The pixel interpolation method includes causing at least one of the first and second pixel value generating units to generate the pixel value of the target pixel using at least one of the variation cycle of the pixel values estimated in the estimating and the determination result determined in the determining of the periodicity of each of the regions.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5A to 5C are diagrams illustrating an example of a periodic region and a non-periodic region;

FIG. 9 is a flowchart illustrating the flow of a process performed in step S810 illustrated in FIG. 8;

DETAILED DESCRIPTION OF THE PREFERRED EMBODIMENTS

An image processing apparatus of the present invention is connected directly by a cable, or through a network, to a scanner device that scans images. The scanner device is assumed to be a scanner device employing a CIS. The image scanned by that scanner device includes a pixel having a missing pixel value or an incorrect pixel value. Therefore, the image processing apparatus of the present invention performs an interpolation process including generating a pixel value of the target pixel and setting the generated pixel value to the target pixel, so as to interpolate the target pixel with the generated pixel value.

When the image is a grayscale image in which one pixel is expressed by 8 bits, the pixel value takes the value of 0 for black and 255 for white. When the image is a color image in which one pixel is expressed by 8 bits for each color of red, green, and blue, the pixel value takes a value in the range of 0 to 255 for each color of red, green, and blue. All pixel values take the value of 0 for black, and all pixel values take the value of 255 for white.

To execute the pixel interpolating process, the image processing apparatus is configured to include a storage device in which a program for executing the processes is recorded, such as a PC, a workstation, a server, or an MFP, a processor that reads and executes the program, and an interface for connecting to the scanner device and the network.

Figure 1:
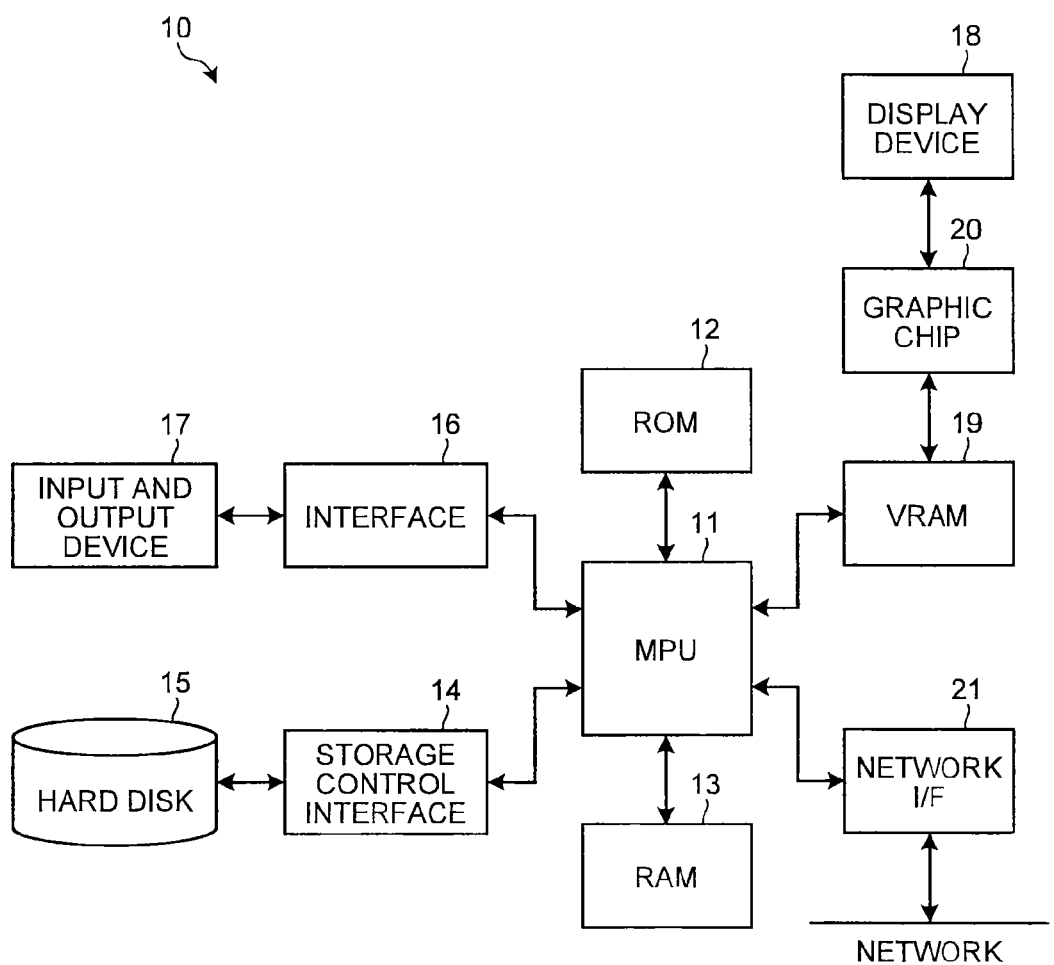
FIG. 1 is a diagram illustrating an example of a hardware configuration of an image processing apparatus according to the present invention.

Specifically, as illustrated in FIG. 1, an image processing apparatus 10 may include a microprocessor unit (MPU) 11 as the processor, for example. Moreover, the image processing apparatus 10 may be configured to include a read only memory (ROM) 12 which is a nonvolatile memory storing a basic input output system (BIOS) and a firmware as the storage device and a random access memory (RAM) 13 providing an execution and storage area for allowing program processing by the MPU 11.

The MPU 11 is connected to a storage control interface 14 which is one kind of interface through an internal bus. The MPU 11 accesses a hard disk 15 which is one of the storage devices connected to the storage control interface 14 and reads, executes, and writes various kinds of application and data. As the storage control interface 14, an interface that controls the input and output of the hard disk 15 in accordance with the standards such as integrated device electronics (IDE), AT attachment (ATA), serial ATA, or Ultra ATA. The MPU 11 can control a serial or parallel interface 16 such as a universal serial bus (USB) or the IEEE 1394 through the internal bus, communicate with an input and output device 17 such as a keyboard, a mouse, or a printer, and receive the input from the user.

The image processing apparatus 10 can be configured to include a video RAM (VRAM) 19 and a graphic chip 20 that process video signals in response to instructions from the MPU 11 and display video on a display device 18 and a network I/F 21 connected to a network to communicate with other devices through the network. The VRAM 19 is a RAM used as a storage device for displaying video on the display device 18, and the graphic chip 20 is an integrated circuit that processes image data.

The image processing apparatus 10 may be configured such that the MPU 11 reads programs stored in the ROM 12, the hard disk 15, and other storage devices (not illustrated) such as a NVRAM or an SD card and expands the programs in the memory area of the RAM 13 to realizes respective processes described later under an suitable operating system (OS), whereby the MPU 11 is configured as respective units for realizing the respective processes. As the OS, the Windows (registered trademark), the UNIX (registered trademark), the LINUX (registered trademark), and the like can be employed. The image processing apparatus 10 is not limited to the above-described PC or the like, but may be configured as an application specific integrated circuit (ASIC) in which a plurality of functional circuits are integrated into one circuit for a specific application.

Figure 2:
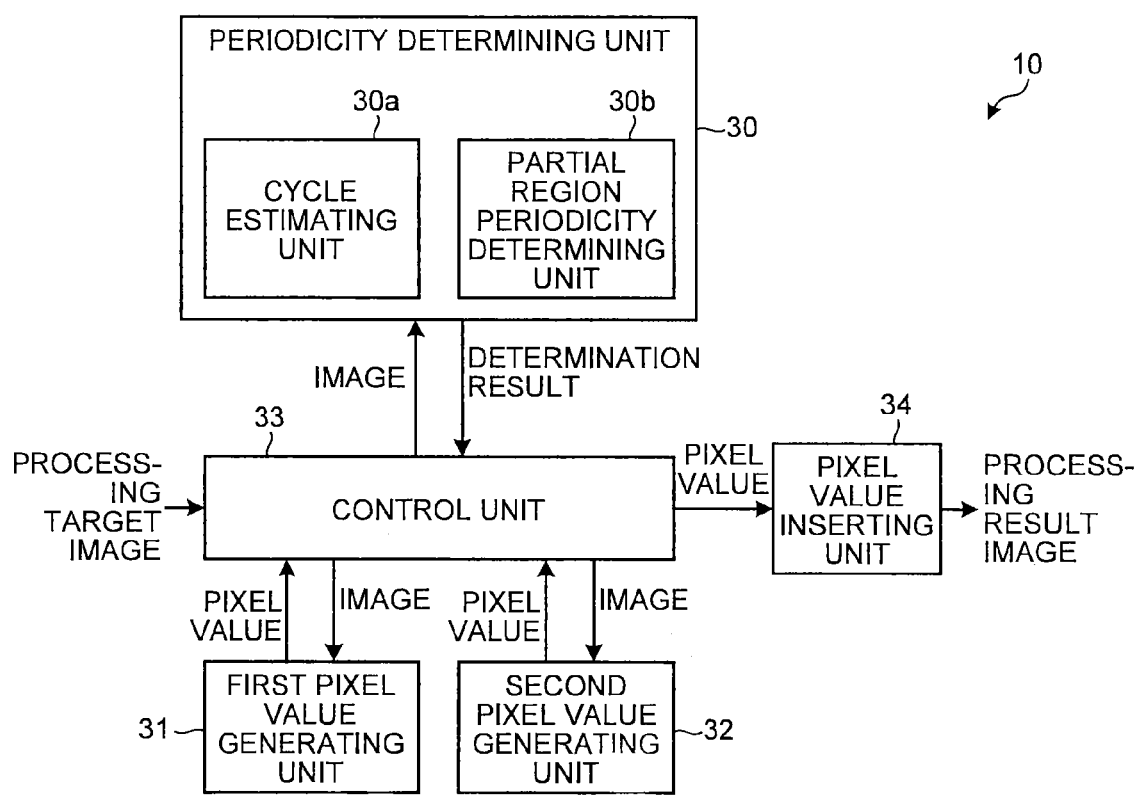
FIG. 2 is a functional block diagram illustrating a first embodiment of the image processing apparatus.

FIG. 2 is a functional block diagram illustrating a first embodiment of the image processing apparatus of the invention. As described above, the image processing apparatus 10 can realize respective functions by causing the MPU 11 which is a process to read and execute the programs stored in the storage device such as the ROM 12 or the hard disk 15. That is, the image processing apparatus 10 is configured to include a periodicity determining unit 30, a first pixel value generating unit 31, a second pixel value generating unit 32, a control unit 33, and a pixel value inserting unit 34. Although not illustrated in FIG. 2, the image processing apparatus 10 may further include a pixel specifying unit that specifies (detects) an interpolation target pixel.

In the image processing apparatus 10, first, the above pixel specifying unit detects, from a processing target image, an interpolation target pixel whose pixel value is to be interpolated (to be inserted thereto). The position of the interpolation target pixel may be detected by the user in advance and may be detected sequentially by the apparatus. The position can be expressed as the coordinates (a, b) using the coordinates of the left bottom corner as the base coordinates (0, 0), where "a" is the number of pixels in the rightward direction corresponding to the main-scanning direction and "b" is the number of pixels in the upward direction.

As the detection method used when the image processing apparatus 10 detects the interpolation target pixel, there is a method of detecting the interpolation target pixel by checking the pixel value for each pixel to determine whether the pixel has a brightness and a color designated in advance. Moreover, there is a method of detecting the interpolation target pixel by evaluating a difference in pixel value from the correct pixel value obtained by scanning a known image. Furthermore, there is a method of detecting the position at which the periodicity of pixel values in the horizontal or vertical direction becomes discontinuous and detecting a pixel at that position as the interpolation target pixel. The interpolation target pixel may be an isolated dot and may be a line segment made up of continuous dots. The reason why the interpolation target pixel may be a line segment is because the gap may be formed to be continuous in the sub-scanning direction which is the moving direction of the imaging element and formed by a line segment made up of continuous dots.

Figure 3:
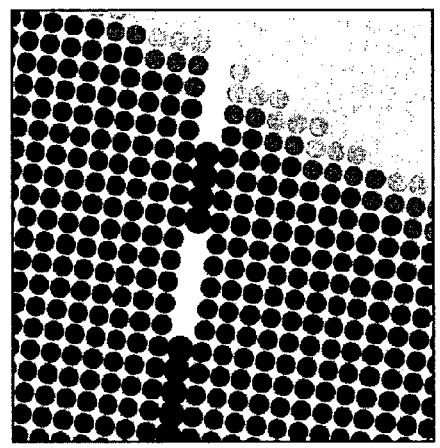
FIG. 3 is a diagram illustrating an example of an image including an interpolation target pixel.

An example of an image including the interpolation target pixel may include one in which a vertical stripe occurs within a halftone dot image in which black dots having approximately the same size are arranged approximately regularly as illustrated in FIG. 3. The vertical stripe is made up of a portion where dots are missing and a portion where dots are larger than the surrounding dots so as to cross the central portion of the image. Such an image has periodicity since dots are arranged at certain intervals, but the periodicity becomes discontinuous in the vertical stripe portion. Thus, the interpolation target pixel can be detected by detecting the position at which the horizontal periodicity becomes discontinuous.

The periodicity determining unit 30 specifies a determination region of a predetermined size in such a manner to include the interpolation target pixel and determines whether a variation in the pixel values within the determination region has periodicity. The determination region may be a region having a height corresponding to one pixel including the interpolation target pixel, namely one line of the image, or alternatively, may be a rectangular region having an optional height including the interpolation target pixel.

The size of the determination region may be set by the user in advance and may be specified dynamically by the device. When the size is dynamically specified by the device, the interpolation process is performed once with a size designated in advance. Then, if the interpolation process can be sufficiently performed with a smaller size, the determination region may be decreased by a certain proportion. Conversely, if the interpolation process cannot be performed with the smaller size, the determination region may be increased by a certain proportion.

Figure 4A:
FIGS. 4A and 4B are diagrams illustrating an example of a determination region and a relation between a position of a pixel in the horizontal direction of the determination region and the pixel value thereof.
Figure 4B:
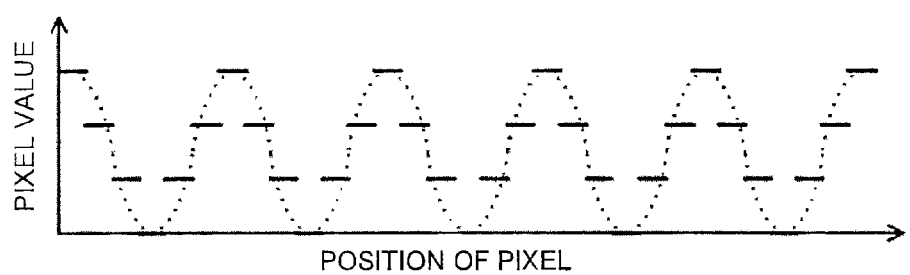

An example in which one line of the image is extracted and used as the determination region is illustrated in FIGS. 4A and 4B. In FIG. 4A, pixels representing black halftone dots and pixels representing a white background are arranged at certain intervals, and gray pixels having different pixel values are arranged between them so as to give gradation. In FIG. 4A, a pixel 40 having a missing pixel value due to the gap is shown.

FIG. 4B illustrates an example of the relation between the positions of pixels in the horizontal direction of the determination region and the pixel values thereof. The pixel values of the pixels have discrete values since each pixel value is constant with the pixel, but when the pixel values are smoothly connected, the pixel values can be expressed as a waveform in which the pixel values increase and decrease with a constant cycle. Thus, in this determination region, it is possible to detect the periodicity of variation in the pixel values.

An example of a determination region having periodicity may be a halftone dot region represented by halftone dots or hatched lines illustrated in FIG. 5A. On the other hand, an example of a determination region having no periodicity may be a discontinuous region made up of a character or irregularly arranged dots illustrated in FIG. 5B and a flat region such as a background represented by one color or gradation illustrated in FIG. 5C.

In the case of a halftone dot image represented by halftone dots, since dots are actually arranged in a linear form with an optional screen angle, the dots are obliquely arranged at certain intervals rather than being arranged at certain intervals in the horizontal direction. Thus, although the halftone dot image does not have such a waveform having the same amplitude as illustrated in FIG. 4B, since the halftone dot image has a waveform which has peaks of different amplitudes at certain intervals, it can be determined that the halftone dot image has periodicity.

Although the presence of periodicity can be easily determined by illustrating in a diagram as in FIG. 3 or FIGS. 4A and 4B, it is practically difficult to create diagrams and make determination with reference to the diagrams. Therefore, for example, a region having a predetermined size including the interpolation target pixel is set as the determination region, the representative cycle within the determination region is estimated, and the periodicity of the entire region is determined. After that, the determination region is divided into partial regions on the left and right sides of the interpolation target pixel, and the periodicity in each of the partial regions is determined. In this way, the periodicity can be determined. Thus, the periodicity determining unit 30 may include a cycle estimating unit 30a to estimate the representative cycle, and a partial region periodicity determining unit 30b to determine the periodicity in each of the partial regions.

If the representative cycle can be calculated by the cycle estimating unit 30a, the periodicity can be determined and the size of the template and the searching region can also be calculated using the representative cycle. Therefore, the periodicity determining unit 30 may include only the cycle estimating unit 30a. Moreover, if the periodicity in the respective left and right partial regions can be determined by the partial region periodicity determining unit 30b, the presence of the periodicity in the determination region can be determined. Moreover, by calculating the representative cycle from the respective partial regions, the size of the template and the searching region can be calculated using the representative cycle. Therefore, the periodicity determining unit 30 may include only the partial region periodicity determining unit 30b. From the above, the periodicity determining unit 30 may be configured to include at least one of the cycle estimating unit 30a and the partial region periodicity determining unit 30b.

When determining the periodicity in the entire region and the periodicity in the respective partial regions, although the variation cycle of the pixel values in the respective determination regions may be calculated, the variation cycle of the pixel values calculated earlier when determining the periodicity in the entire region can be used for determining the periodicity in the respective partial regions. In these determination processes, the degree of confidence of the cycle is calculated using the calculated variation cycle, and it is determined whether the degree of confidence is equal to or larger than a threshold value.

When determining the periodicity, the periodicity in the entire region may be determined first, and then the periodicity in the left and right regions after division may be determined later as described above. However, the order of determining the periodicity is not limited to this, and the periodicity in the entire region may be determined after determining the periodicity in the left and right regions.

As a calculation example of the representative cycle, the positions (peak positions) at which the pixel values reach their local maximum within the determination region, i.e., the positions of pixels each having a peak value in the positive direction of the waveform illustrated in FIG. 4B are recorded, the histogram of distance from a certain peak position to the next peak position is created over the entire determination region, and then, the distance corresponding to the maximum frequency which is the value of a class having the largest frequency is employed as the representative cycle. The representative cycle can be expressed by the number of pixels. In the example illustrated in FIGS. 4A and 4B, peaks occur at intervals of approximately 6 pixels, and the distance between the adjacent peaks is mostly 6 pixels. Therefore, the representative cycle is set to 6 pixels. Alternatively, a distance of "representative cycle±1" may be used from the perspective of allowing a certain degree of error in the representative cycle.

In this case, the representative cycle may be calculated using the positions at which the pixel values reach their local minimum, i.e., the positions of pixels each having a peak value in the negative direction of the waveform illustrated in FIG. 4B rather than using the positions at which the pixel values reaches their local maximum. Noise resistance is low if the representative cycle is calculated using the periodicity of variation in the pixel values. In contrast, if autocorrelation of the pixel values is calculated and the periodicity of the variation thereof is used, noise resistance increases. Thus, when calculating the representative cycle using the positions at which the pixel values reach their local maximum and the positions at which the pixel values reach their local minimum, it is preferable to use autocorrelation. The reason why the noise resistance increases is because noise is superimposed on the pixel values in many cases, the effect of noise can be suppressed to be low by using autocorrelation derived from a plurality of sets of the pixel values rather than directly using the pixel values.

Autocorrelation is correlation between a certain signal and a signal having a predetermined phase shift relative to the certain signal. In this case, autocorrelation is calculated within a determination region, a histogram is created using the autocorrelation value instead of the pixel value, and the most frequency value is employed as the representative cycle. As the autocorrelation value, a correlation coefficient may be used, and a covariance may be used to make calculation easier.

Here, covariance S is an index representing the magnitude of covariation of two pixel values and can be calculated by Expression (1) below in which "$x_i$" is a pixel value of the i-th pixel in one of the two comparison patterns, "$y_i$" is a pixel value of the i-th pixel in the other pattern, "$x_m$" is the average value of the pixel values in the one pattern, "$y_m$" is the average value of the pixel values in the other pattern, and "n" is the number of pixels in the pattern.

$$S = \frac{1}{n}\sum_{i=1}^{n}(x_i - x_m)(y_i - y_m) \tag{1}$$

The correlation coefficient R is an index representing the degree of similarity between two random variables and can be calculated by Expression (2) below in which "$\sigma_x$" is a standard deviation of one pattern, and "$\sigma_y$" is a standard deviation of the other pattern.

$$R = \frac{\sum_{i=1}^{n}(x_i - x_m)(y_i - y_m)}{\sigma_x \sigma_y} \tag{2}$$

Degree of confidence $C_v$ can be calculated using Expression (3) below, for example. In Expression (3), "T" is the representative cycle calculated above, "$F_r$" is the frequency of the distance corresponding to the representative cycle T in the histogram, and "N" is the number of pixels in the determination region. As the "$F_r$", the sum of the frequencies of T±1 may be used in order to allow errors when estimating the representative cycle as well as the frequency of the representative cycle T. Expression (3) defines, as the degree of confidence, the proportion of pixels having the same distance between the peak positions as the representative cycle to the pixels included in the entire determination region.

$$C_v = \frac{T \times F_r}{N} \tag{3}$$

When the degree of confidence is higher than a threshold value, the determination region is determined to have periodicity. When the degree of confidence is equal to or smaller than the threshold value, it is determined that no periodicity is present in the determination region. The threshold value can be set by the user in advance, or alternatively, can be determined dynamically. When the threshold value is set by the user in advance, the threshold value can be determined and set by performing simulations or tests and calculating the degree of confidence ideal for determining the presence of periodicity. When the threshold value is determined dynamically, an intermediate value of the degrees of confidence, which are actually calculated with respect to a halftone dot region having periodicity and either one of a discontinuous region and a flat region having no periodicity, can be determined as the threshold value.

The first pixel value generating unit 31 generates the pixel value of an interpolation target pixel using a pattern matching method as an interpolation method, for example. As a specific example of the pattern matching method, template matching can be used. The template matching can be performed by using a template which is the image of a portion designated within an image and finding, from the image, positions resembling the template to calculate the degree of coincidence between the template and the pattern within the image.

When performing template matching, first, the size of the template is determined. The width of the template is set based on the representative cycle calculated in the above-described manner. As above, although the width of the template can be made to be identical to the width of the representative cycle, the width is not limited to this. The width may be slightly larger or smaller by one pixel to each of the left and right sides than the number of pixels corresponding to the width of the representative cycle. Although the height of the template may be set to be identical to the height of the representative cycle similarly to the width, the height is not limited to this, but may be slightly larger or smaller. Although, in this example, the width and height are set to be larger or smaller by one pixel to each of the left and right sides, the width and height may be set to be larger or smaller by two pixels or more.

Figure 6A:
FIGS. 6A and 6B are diagrams illustrating an example of an image illustrating a representative cycle and a template.
Figure 6B:
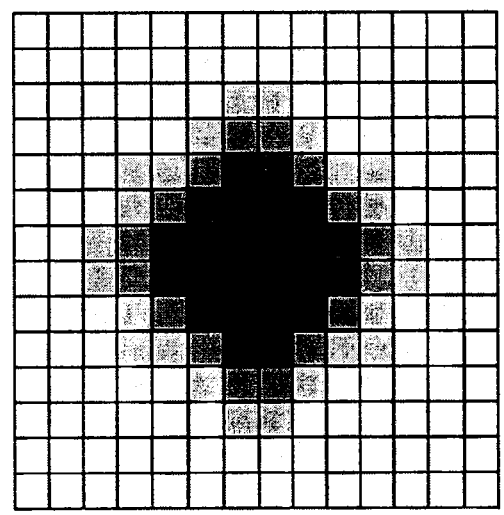

When the interpolation target pixel belongs to the halftone dot region, the template is preferably set as a square region of which one side is approximately the representative cycle. This is because, when an image representing the representative cycle is such an image having a width of 14 pixels and height of one pixel as illustrated in FIG. 6A, by setting the template as a square region having a width of 14 pixels and a height of 14 pixels, it is possible to express one halftone dot as illustrated in FIG. 6B. As above, by setting the size of the template as a region corresponding to one halftone dot, when searching for a similar pattern, it is possible to a similar pattern optimal to a halftone dot including the interpolation target pixel using information of only one halftone dot.

Moreover, when the representative cycle is as very small as 3 pixels, for example, the size of the template may be set to be as slightly larger as 5 pixels by adding one pixel to each of the left and right side of the 3 pixels. This is because, when the representative cycle is very small, the number of pixels used for evaluation of the degree of coincidence becomes so small that the stability of detection of similar pattern decreases.

The first pixel value generating unit 31 creates a template based on the size of the template determined in the above-described manner. A region including the interpolation target pixel and having the size of the template is cut from the image and set as a template image. In this case, the template image is preferably cut and set as a shape which is horizontally and vertically symmetrical about the interpolation target pixel. By cutting and setting the template in this way, a similar pattern may be searched for without depending on the directionality of the pattern including the interpolation target pixel.

After creating the template, the first pixel value generating unit 31 sets a predetermined region to be searched when searching for a similar pattern using the template. The region to be searched can be set based on the representative cycle. When the image representing the representative cycle is the image having the width of 14 pixels and the height of one pixel, for example, the region to be searched can be set as a square region having a width of 42 pixel and a height of 42 pixels the same as the width by adding 14 pixels to each of the left and right sides of the representative cycle. As above, by setting the region to be searched as a region having the same number of pixels in width and height, searching may be performed without depending on the directionality of the pattern in the range to be searched. The above region having the width of 42 pixels and the height of 42 pixels is just an example but is not limited to this. Instead, a larger region having a width of 70 pixels and a height of 70 pixels, for example, may be set as the region to be searched.

Although the region to be searched is not limited to the above square region, when it is necessary to suppress the height of the range to be low due to restriction or the like of an image buffering memory, it is preferably to increase the width by that much. This is because, when the height is suppressed to be low, the number of targets to be searched to retrieve a similar pattern decreases, and the accuracy of interpolation decreases. Moreover, when the periodicity determining unit 31 determines that a region positioned at the left side of the interpolation target pixel is non-periodic region, it is preferable to exclude the region positioned at the left side of the interpolation target pixel from the searching region. The same is true for the right side. By narrowing the region to be searched in this way, it is possible to prevent such detection errors that a similar pattern is retrieve from a region in which the similar pattern should not to be retrieved.

After setting the region to be searched in the above-described manner, the first pixel value generating unit 31 searches for a similar pattern present within the region to be searched using the created template. Specifically, the degree of coincidence with the template at respective positions within the region to be searched is calculated, and the position having the highest degree of coincidence is selected as the similar pattern. As the degree of coincidence, the degree of dissimilarity such as sum of absolute difference (SAD) or sum of squared difference (SSD) and the degree of similarity such as a correlation coefficient or a covariance can be used.

The SAD is obtained by cutting patterns to be compared with the template, calculating a difference in luminance value between the pixel in the template and the pixel in each of the cut patterns, which are positioned at the same pixel positions, and calculating the sum of the absolute values of the differences. The degree of similarity increases as the sum decreases, and the degree of dissimilarity increases as the sum increases. On the other hand, the SSD is obtained by calculating the square of each difference in luminance value and calculating the sum of the squares. The degree of similarity increases as the sum decreases, and the degree of dissimilarity increases as the sum increases. The correlation coefficient and the covariance can be calculated by Expressions (1) and (2) above. The correlation coefficient takes a value in the range of "−1" to "1", in which a strong positive correlation occurs as the value approaches 1, a weak correlation occurs as the value approaches 0, and a negative correlation occurs as the value approaches −1. This means that two patterns are similar as the value approaches 1, and that one pattern is similar to an inverted version of the other pattern as the value approaches −1. From this, it can be determined that the degree of similarity is high as the value increases. Since the covariance corresponds to the correlation coefficient, it can be determined that the degree of similarity is high as the value increases.

When evaluating the degree of coincidence, it is preferable to exclude the interpolation target pixel from pixels used for the calculation of the degree of coincidence so that the pixel value of the interpolation target pixel does not affect the degree of coincidence, or preferable to set, as the interpolation target pixel, a virtual pixel value by using the pixel value of a pixel of a comparison target pattern at the same position as the interpolation target pixel. A plurality of similar patterns may be selected in descending order of the degrees of coincidence.

Moreover, when there are a plurality of interpolation target pixels in the entire image, at the time of calculating the degree of coincidence, it is preferable to exclude other interpolation target pixels from pixels used for the calculation as well as an interpolation target pixel into which its pixel value is presently being inserted, or preferable to set, as the interpolation target pixel, a virtual pixel value by using the pixel value of a pixel of the comparison target pattern at the same position. This is because not only the interpolation target pixel into which its pixel value is presently being inserted but also other interpolation target pixels are included in a base pattern or a comparison target pattern, and the interpolation target pixel basically has a missing pixel value or holds an incorrect pixel value, it is not preferable to use such interpolation target pixels in calculation of the degree of coincidence. The pixel value of the interpolation target pixel into which its pixel value has already been inserted can be used for the calculation of the degree of coincidence. Moreover, when other interpolation target pixels are included in the comparison target pattern, it is preferable to exclude them from pixels used for the calculation, or preferable to set a virtual pixel value by using the pixel value of a pixel of the base pattern at the same position.

In the most similar pattern searched for in this way, the pixel value of the pixel at the position corresponding to the interpolation target pixel in the template is acquired. When only the most similar pattern is used, the pixel value acquired in this way can be used as the pixel value of the interpolation target pixel. Moreover, when a plurality of patterns selected in descending order of the degrees of coincidence are used, the pixel values acquired from the plurality of patterns may be synthesized to obtain the pixel value of the interpolation target pixel. As a method of synthesizing pixel values, there are a method of averaging the pixel values with a fixed weighting, and a method of calculating a weighted average by controlling weighting such that a large weighting is applied as the degree of coincidence of the similar pattern increases.

The template matching includes one-dimensional template matching and two-dimensional template matching. In the two-dimensional template matching, optional regions in the vicinity of an interpolation target pixel within an image, that is, regions presented in the left and right sides or the upper and lower sides or in the oblique direction of the interpolation target pixel are cut as patterns, and the degree of coincidence between the pattern and the template is calculated to search for the most similar pattern. The template matching which has been described hereinabove is two-dimensional template matching. In contrast, in one-dimensional template matching, patterns are cut from one line including the interpolation target pixel, and the most similar pattern is searched for.

The second pixel value generating unit 32 generates the pixel value of the interpolation target pixel using a different interpolation method from that of the first pixel value generating unit 31. As the different interpolation method, an interpolating method can be used. The interpolating method includes nearest-neighbor interpolation (0-order interpolation), linear interpolation (1-order interpolation), parabolic interpolation (2-order interpolation), cubic interpolation (3-order interpolation), polynomial interpolation, spline interpolation, Lagrange interpolation, and the like. Moreover, bilinear interpolation, bicubic interpolation, and the like which expand linear interpolation or cubic interpolation two-dimensionally can also be used.

Meanwhile, the term "interpolation method" as used in this disclosure is intended to encompass: the "interpolating method" such as the nearest-neighbor interpolation, linear interpolation, parabolic interpolation, cubic interpolation, polynomial interpolation, spline interpolation, or Lagrange interpolation; the "pattern matching method" including template matching as describe above; and any other type of method for interpolating a pixel.

Figure 7A:
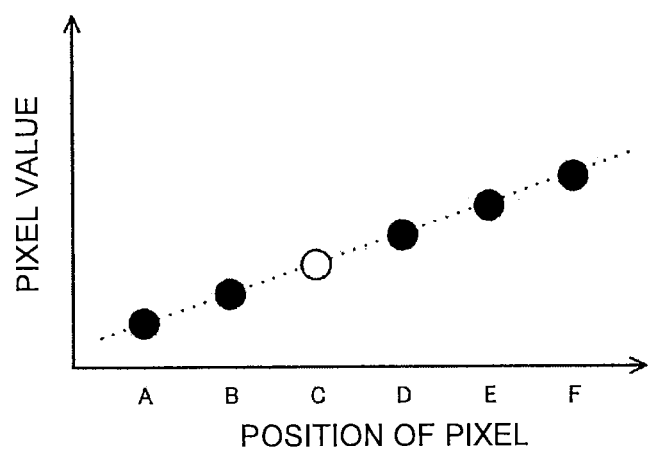
FIGS. 7A and 7B are diagrams illustrating an example of a relation between the position of a pixel and the pixel value thereof.

When there are pixels A to F arranged in that order on one line, and the pixel value of the pixel C is missing, the graph showing the relation between the position and the pixel value of that pixel is as illustrated in FIG. 7A. The actual pixel value of the pixel C is a value indicated by a white circle. In this case, since the pixel value increases by a certain value as the pixel position moves by one pixel, the relation between the position and the pixel value of the pixel can be expressed by a linear function. Thus, the pixel value of the pixel C which is to be inserted can be calculated using the obtained linear function (linear interpolation).

Figure 7B:
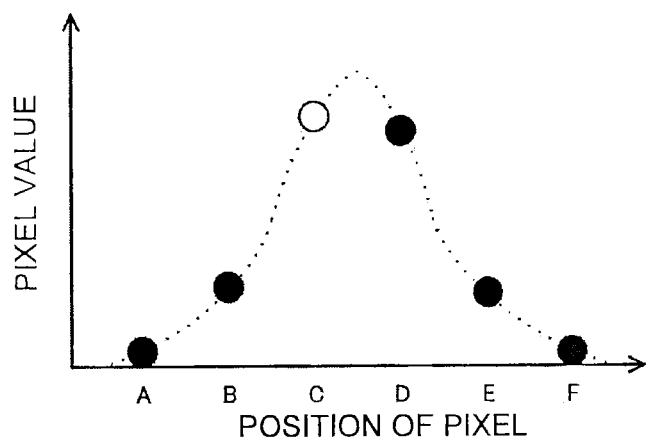

Moreover, when the relation is expressed by a curve as illustrated in FIG. 7B, the pixel value can be calculated by selecting an interpolation method most ideal to that curve. The parabolic interpolation can be selected when the relation can be expressed by a quadratic function, the cubic interpolation can be selected when the relation can be expressed by a cubic function, the polynomial interpolation or the Lagrange interpolation can be selected when the relation can be expressed by a polynomial expression, and the spline interpolation can be selected when the relation can be expressed by individual polynomial expressions.

In this example, the first pixel value generating unit 31 employs the pattern matching method, and the second pixel value generating unit 32 employs the interpolating method. Alternatively, the first pixel value generating unit 31 may employ the interpolating method, and the second pixel value generating unit 32 may employ the pattern matching method. Moreover, the pixel value generating units may employ the same interpolating method, or may use linear interpolation for one and spline interpolation for the other.

The control unit 33 receives a processing target image, sends the image to the periodicity determining unit 30, receives the result of the determination by the periodicity determining unit 30, and determines which one of the first pixel value generating unit 31 and the second pixel value generating unit 32 to be used for generating the pixel value based on the determination result. For example, when the periodicity determining unit 30 determines that the data have periodicity, the control unit 33 may employ the first pixel value generating unit 31 which uses the pattern matching method, and otherwise, the control unit 33 may employ the second pixel value generating unit 32 which uses the interpolating method. Moreover, the control unit 33 sends the image data to the determined one of the first pixel value generating unit 31 and the second pixel value generating unit 32, receives the pixel value generated by the determined pixel value generating unit, and sends the image data, the position information of the set pixel, and the pixel value to the pixel value inserting unit 34.

The pixel value inserting unit 34 inserts the pixel value generated using the first pixel value generating unit 31 or the second pixel value generating unit 32 determined by the control unit 33 into the interpolation target pixel set in advance. The pixel value inserting unit 34 inserts the pixel value generated by the first pixel value generating unit 31 or the second pixel value generating unit 32 to the interpolation target pixel. In this way, the interpolation process for one interpolation target pixel is completed. When there is a plurality of interpolation target pixels, the processes in the respective units are repeated plural times corresponding to the number of interpolation target pixels.

The process, in which these respective units perform the respective processes to generate the pixel value of the interpolation target pixel, the pixel value of the interpolation target pixel is inserted, will be described with reference to the flowchart illustrated in FIG. 8. When this process starts from step S800, first, in step S805, the pixel specifying unit detects a pixel into which its pixel value is to be inserted and sets the pixel as an interpolation target pixel. This detection can be performed using the above-described method. When there is a plurality of interpolation target pixels, one pixel may be selected sequentially in the arrangement order based on the coordinate position at which the pixels are arranged, for example, and the selected pixel may be set as the interpolation target pixel.

In step S810, the periodicity determining unit 30 designates a region including the interpolation target pixel and determines whether a variation in the pixel values within the region has periodicity. The region is designated using the method of determining the size of the region and the method of determining periodicity, and the presence of periodicity is determined.

Subsequently, in step S815, an interpolation method used for the interpolation target pixel is determined. In this step, the control unit 34 determines one of the first pixel value generating unit 31 and the second pixel value generating unit 32 to be employed for generating the pixel value of the interpolation target pixel based on the determination result in step S815. As described above, when the periodicity determining unit 31 determines that periodicity is present, the pattern matching method is selected. When the periodicity determining unit 31 determines that periodicity is not present, the interpolating method is selected.

In step S820, it is determined whether the first pixel value generating unit 31 is employed. When the interpolation method selected in step S815 is the pattern matching method, it is determined that the first pixel value generating unit 31 performing the interpolation process using the pattern matching method is to be employed. On the other hand, when the interpolation method other than the pattern matching method, it is determined that the first pixel value generating unit 31 is not to be employed.

When the first pixel value generating unit 31 is determined to be employed in step S820, the flow proceeds to step S825. In step S825, a similar pattern is searched for by using the interpolation method used by the first pixel value generating unit 31, namely the pattern matching method in this example, and the pixel value of the interpolation target pixel is generated based on the similar pattern thus searched for. On the other hand, when the first pixel value generating unit 31 is determined not to be employed in step S820, the flow proceeds to step S830. In step S830, the pixel value of the interpolation target pixel is generated by using the interpolation method used by the second pixel value generating unit 32, namely the interpolating method in this example.

Subsequently, in step S835, the pixel value of the interpolation target pixel generated in step S825 or S830 is inserted to the interpolation target pixel set in step S805. Since the interpolation target pixel does not have a pixel value or have an incorrect value if it has, a pixel value is set to the interpolation target pixel by inserting the generated pixel value into the interpolation target pixel. Then, the flow proceeds to step S840, and it is determined whether all the interpolation target pixels have been completely interpolated. When a plurality of interpolation target pixels is detected in step S805, it is determined whether all the plurality of interpolation target pixels have been interpolated with the generated pixel values.

When it is determined in step S840 that all the interpolation target pixels have been completely interpolated, the flow proceeds to step S845, and this process ends. On the other hand, when it is determined that the pixel values of all the interpolation target pixels have not been completely interpolated, the flow returns to step S805. In step S805, a process of specifying the next interpolation target pixel, generating the pixel value, and inserting the generated pixel value is performed.

In step S810, in order to determine the periodicity in the region including the interpolation target pixel, a process as illustrated in FIG. 9 is executed. First, the step of determining the periodicity starts in step S900, and a representative cycle is estimated in step S905. That is, the representative cycle necessary for calculating the degree of confidence, as well as necessary for determining the size of the template and the region to be searched is calculated. Moreover, in step S910, the periodicity in the entire determination region is determined using the representative cycle.

Subsequently, in step S915, the determination region is divided into partial regions on the left and right sides of the interpolation target pixel, and specifies the left and right regions. In step S920, first, the representative cycle in the region on the left side of the interpolation target pixel is calculated, and the periodicity is determined using the representative cycle. Subsequently, in step S925, the representative cycle in the region on the right side of the interpolation target pixel is calculated, and the periodicity is determined using the representative cycle. When these determination processes ends, the periodicity determination process of step S930 ends.

Figure 10A:
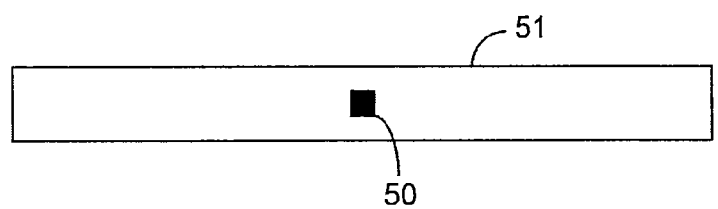
FIGS. 10A to 10C are diagrams illustrating a determination region used for determining the periodicity of a partial region.
Figure 10B:

In steps S915 to S925, a determination region 51 is set so that an interpolation target pixel 50 is located at the center as illustrated in FIG. 10A, the determination region 51 is divided to have partial regions on the left and right sides of the interpolation target pixel 50 as illustrated in FIG. 10B. The region on the left side of the interpolation target pixel 50 is set as a partial region 52 for determining the periodicity of the left side, and a region on the right side of the interpolation target pixel 50 is set as a partial region 53 for determining the periodicity of the right side. In this way, the periodicity of the partial regions 52 and 53 can be determined.

Figure 10C:
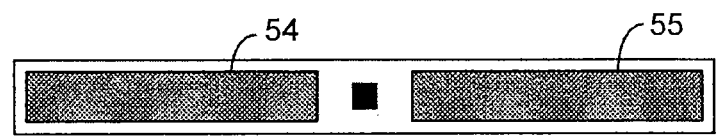

As long as the presence of periodicity can be appropriately determined, it is not necessary to set, as the determination regions, the large partial regions 52 and 53 positioned on the left and right sides of the interpolation target pixel 50, which are obtained by excluding the interpolation target pixel 50 and the upper and lower pixels thereof from the determination region 51 as illustrated in FIG. 10B. Instead, smaller partial regions 54 and 55 as illustrated in FIG. 10C may be set. Moreover, the partial region needs not be located inside the determination region 51 but may be set so as to partially protrude out from the determination region 51.

In FIG. 10B, although the determination region 51 is set as a two-dimensional region having predetermined width and height of three pixels or more, the determination region 51 may be set as a one-dimensional region having the same height as the interpolation target pixel 50, namely one pixel, and having a width made up of a predetermined number of pixels.

As above, by determining the periodicity in the regions on the left and right sides of the interpolation target pixel and the periodicity in the entire determination region including the interpolation target pixel, it is possible to determine the periodicity in the region including the interpolation target pixel. That is, if the entire region has periodicity, it can be said that the region including the interpolation target pixel has periodicity, and the region including the interpolation target pixel can be determined as a region having periodicity.

Figure 11:
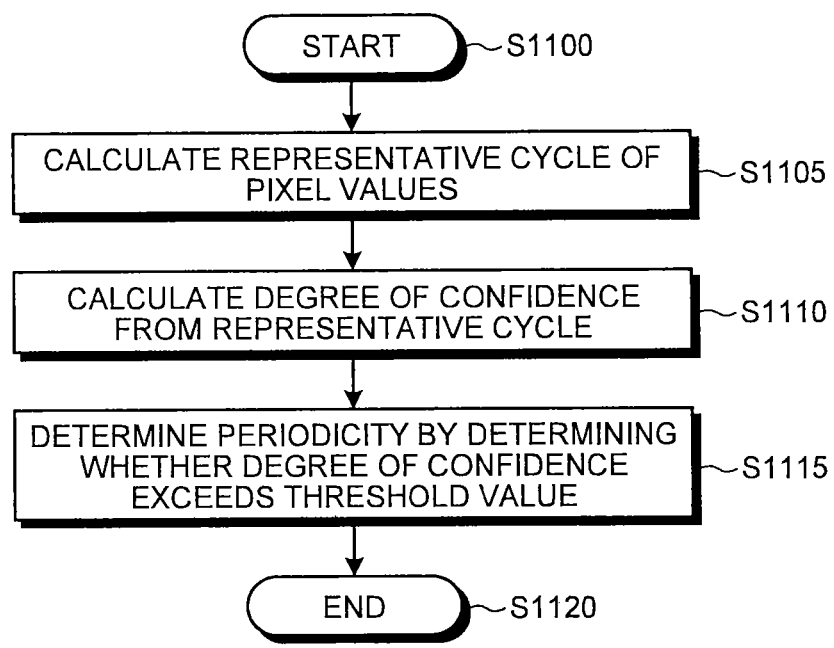
FIG. 11 is a flowchart illustrating a detailed process of the periodicity determination performed in steps S910, S920, and S925 illustrated in FIG. 9.

In the determination performed in steps S910, S920, and S925, the process illustrated in FIG. 11 is performed in order to determine the presence of the respective periodicities. First, in step S1100, when the respective steps (steps S910, S920, and S925) are executed, the processes are started. In step S1105, the maximum frequency of the distance between peaks at which the pixel value within the determination region reaches its local maximum is calculated in the above-described manner, and the maximum frequency is calculated as the representative cycle of the pixel values. Since the representative cycle in the entire determination region is calculated in step S910, the representative cycle calculated in that step can be employed, and the description thereof will not be described.

Subsequently, in step S1110, the degree of confidence is calculated using the representative cycle calculated in the previous steps. The degree of confidence can be calculated using Expression (3) described above. In step S1115, it is determined whether the calculated degree of confidence exceeds a threshold value, whereby the presence of periodicity is determined, and this process ends in step S1120. When the degree of confidence exceeds the threshold value, it is determined that the periodicity is present. When the degree of confidence is equal to or smaller than the threshold value, it is determined that the periodicity is not present.

Figure 12:
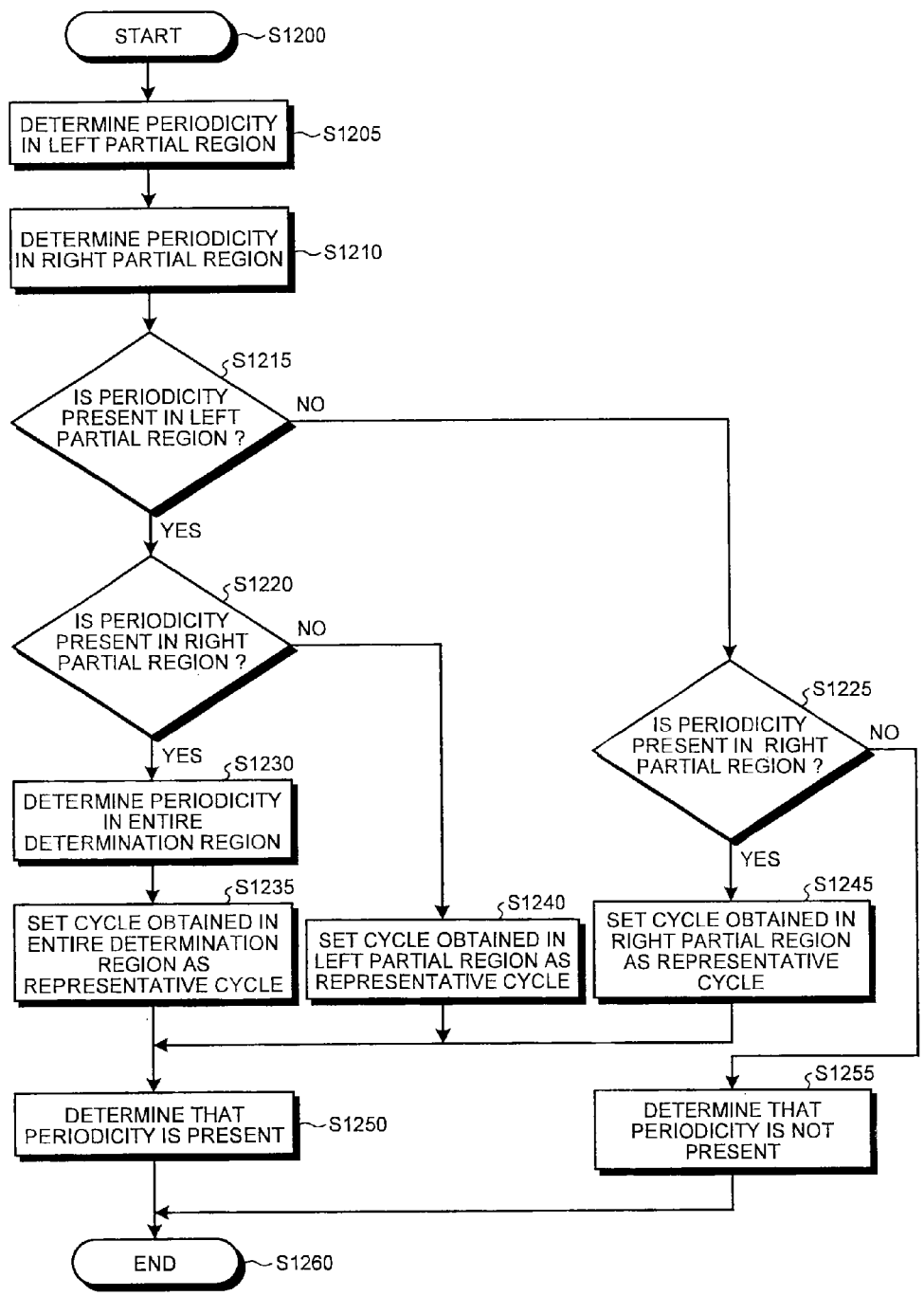
FIG. 12 is a flowchart illustrating the flow of another process performed in step S810 illustrated in FIG. 8.

In the flow of the processes illustrated in FIG. 9, after estimating the representative cycle, the periodicity in the entire determination region is determined. Subsequently, the periodicity in the left partial region is determined, and subsequently thereto, the periodicity in the right partial region is determined, whereby the periodicity in the region including the interpolation target pixel is determined. However, the embodiment is not limited to this. For example, after determining the periodicity in the left and right partial regions is determined, the periodicity in the entire determination region may be determined. Alternatively, when it is determined that periodicity is present in the left and right partial regions, the cycles thereof may be employed as the representative cycle, and it is determined that periodicity is present in the entire determination region. On the other hand, when it is determined that periodicity is not present in both the left and right partial regions, it is determined that periodicity is not present in the entire determination region. The process applicable to this case will be described with reference to FIG. 12.

This process starts from step S1200. In step S1205, first, the periodicity in the left partial region is determined. This can be performed by performing the same calculation using Expressions 1 to 3 as used in the process illustrated in FIG. 11 and determine whether the degree of confidence exceeds a threshold value. Subsequently, in step S1210, the periodicity in the right partial region is determined by the same method.

After these determination processes end, it is determined in step S1215 whether the periodicity is present in the left partial region. When the periodicity is present, the flow proceeds to step S1220, and it is determined whether periodicity is present in the right partial region. When the periodicity is not present, the flow proceeds to step S1225, and it is determined whether periodicity is present in the right partial region. These determination processes can be performed based on the determination results obtained in steps S1205 and S1210.

When it is determined in step S1220 that periodicity is present in the right partial region, it is expected that periodicity is present in the entire determination region, and then, the flow proceeds to step S1230. In step S1230, it is determined and confirmed whether periodicity is present in the entire determination region. Then, the flow proceeds to step S1235, and the cycle obtained in the entire determination region in this example is set as the representative cycle. On the other hand, when it is determined in step S1220 that periodicity is not present in the right partial region, the flow proceeds to step S1240, and the cycle obtained in the left partial region in which the presence of periodicity is determined is set as the representative cycle.

Moreover, when it is determined in step S1225 that periodicity is present in the right partial region while periodicity is not present in the left partial region, the flow proceeds to step S1245, and in this case, the cycle obtained in the right partial region is set as the representative cycle. In this way, when the representative cycle is set, the flow proceeds to step S1250, and it is determined that periodicity is present. That is, this is the case when the representative cycle has been set in steps S1235, S1240, and S1245.

On the other hand, when it is determined in step S1225 that periodicity is not present in both the left partial region and the right partial region has periodicity, the flow proceeds to step S1255, and it is determined that periodicity is not present. When these determination processes end, the flow proceeds to step S1260, and this process ends.

From the above, if it is determined that periodicity is present in at least one of the left and right partial regions, it is determined that periodicity is present. On the other hand, if it is determined that periodicity is not present in both partial regions, it is determined that periodicity is not present. This is because, if it is determined that periodicity is present in at least one of the left and right partial regions, it is highly likely that periodicity is present in the region including the interpolation target pixel. Thus, interpolation can be performed with higher accuracy when the interpolation process is performed by employing the interpolation method used when it is determined that periodicity is present in the determination region.

Figure 8:
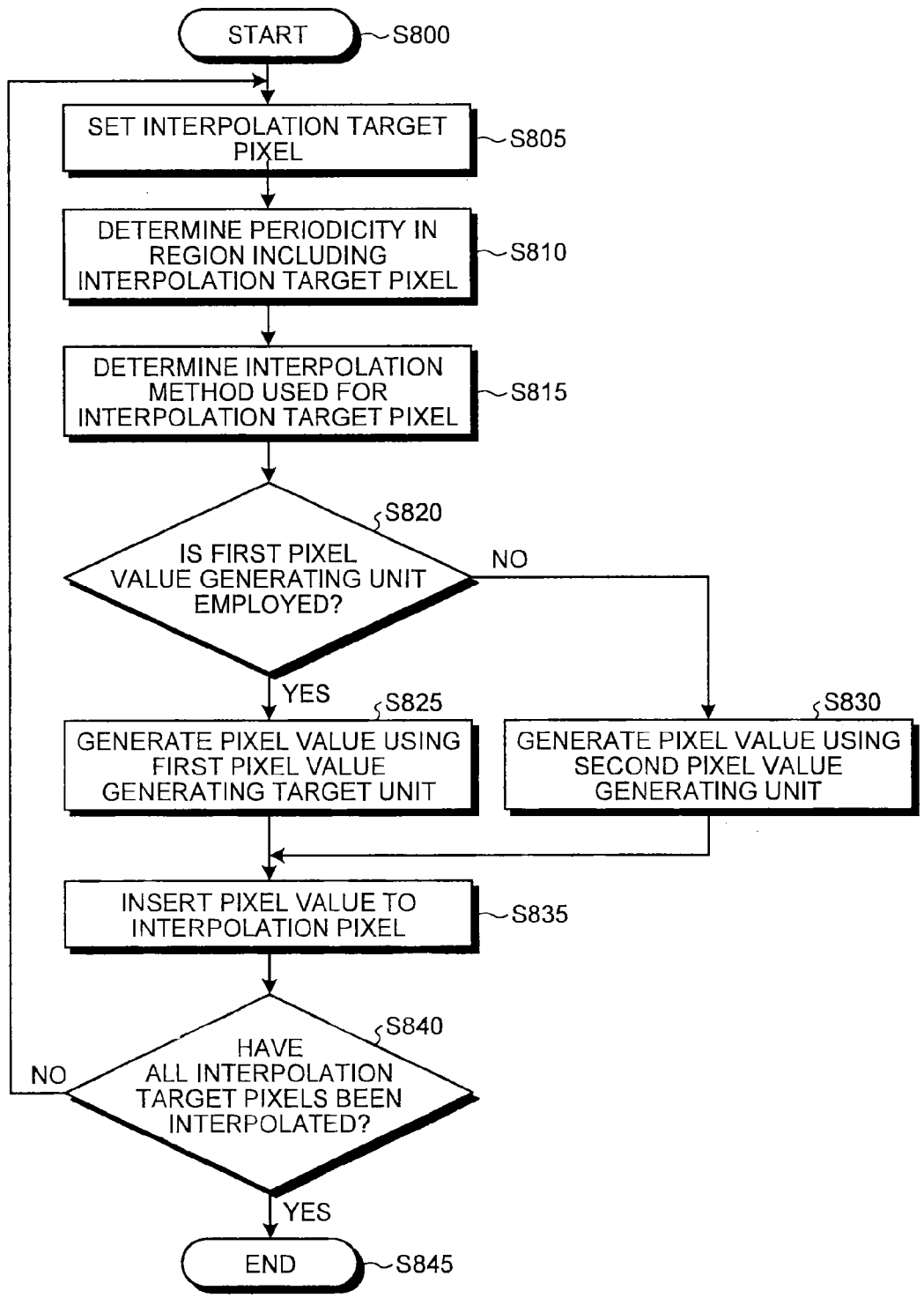
FIG. 8 is a flowchart illustrating the flow of a pixel interpolation process executed by the image processing apparatus illustrated in FIG. 2.
Figure 13:
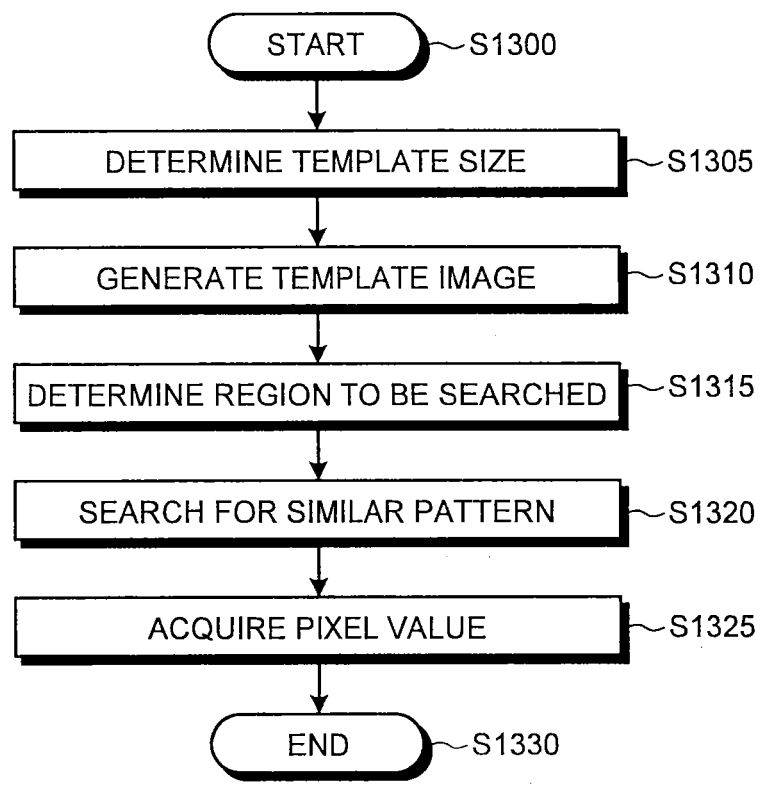
FIG. 13 is a flowchart illustrating the flow of a process performed in step S825 illustrated in FIG. 8.

In step S825 illustrated in FIG. 8, when the first pixel value generating unit 31 generates the pixel value of an interpolation target pixel by the template matching, the first pixel value generating unit 31 executes the process illustrated in FIG. 13. First, in step S1300, this process starts, and the size of the template is determined in step S1305. The size can be determined with reference to the representative cycle as described above.

Subsequently, in step S1310, based on the size of the template thus determined, a region having that size including the interpolation target pixel is cut and set as a template image so as to create a template which is a base pattern. Subsequently, in step S1315, a region to be searched to retrieve a similar pattern is determined using the template. The region to be searched can also be determined based on the representative cycle.

In step S1320, the determined region is searched using the template to specify a pattern having the highest degree of coincidence. In step S1325, the pattern is compared with the template, and the pixel value of a pixel at the position corresponding to the position of the interpolation target pixel is acquired as the pixel value to be inserted into the interpolation target pixel. When the pixel value is acquired, the flow proceeds to step S1330, and the process ends.

Figure 14:
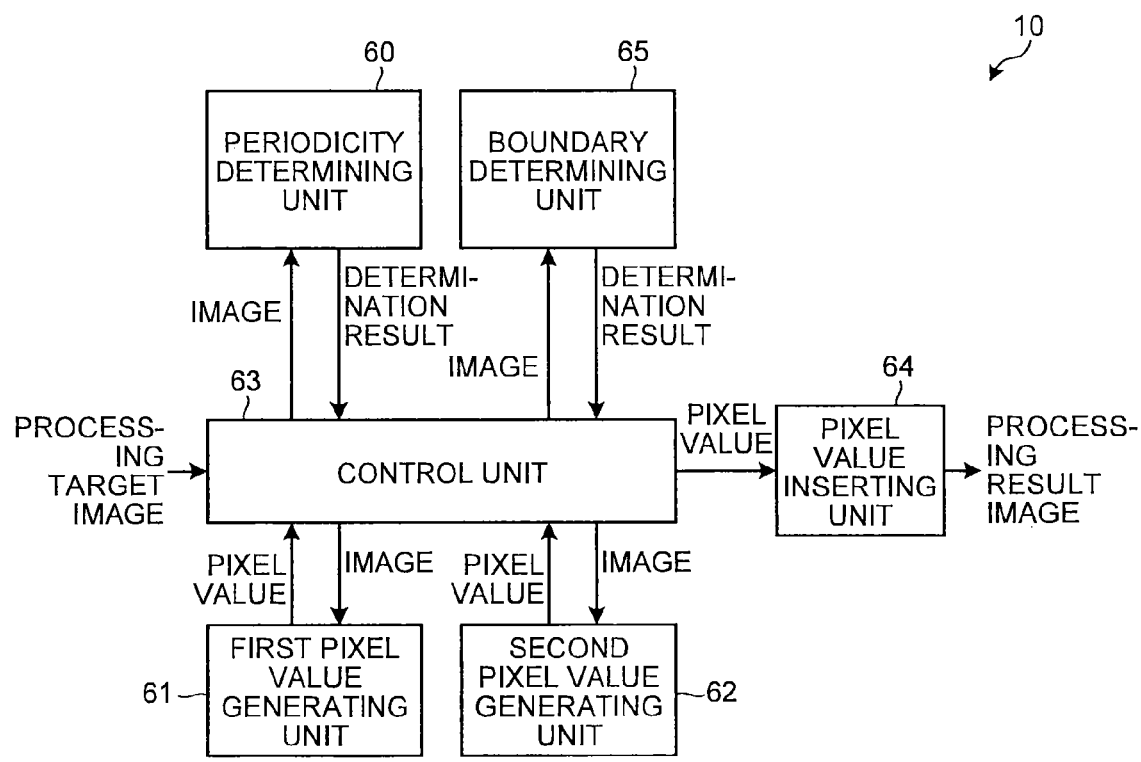
FIG. 14 is a functional block diagram illustrating a second embodiment of the image processing apparatus.

FIG. 14 is a functional block diagram illustrating a second embodiment of the image processing apparatus. In this embodiment, the image processing apparatus includes a periodicity determining unit 60, a first pixel value generating unit 61, a second pixel value generating unit 62, a control unit 63, and a pixel value inserting unit 64 which are the same as those of the first embodiment illustrated in FIG. 2. In addition, the image processing apparatus further includes a boundary determining unit 65. The periodicity determining unit 60 includes at least one of the cycle estimating units and the partial region periodicity determining unit similarly to the periodicity determining unit 30 illustrated in FIG. 2.

Since the processes performed by the periodicity determining unit 60, the first pixel value generating unit 61, the second pixel value generating unit 62, the control unit 63, and the pixel value inserting unit 64 are the same as those of the first embodiment, the description thereof will not be provided herein. Thus, the boundary determining unit 65 will be described. The boundary determining unit 65 determines whether an interpolation target pixel actually belongs to a periodic region when the periodicity determining unit 60 determines that an image region including the interpolation target pixel is a region (periodic region) in which periodicity is present.

The interpolation target pixel is present either within a periodic region or a non-periodic region, and the pixel value of the interpolation target pixel can be estimated from the pixel values of pixels present in the vicinity of the interpolation target pixel within the same region. This is because a pattern made up of several continuous pixels including the interpolation target pixel is similar to patterns present in the vicinity thereof, the pattern can be estimated from the patterns present in the vicinity thereof.

However, when the interpolation target pixel is present in the vicinity of the boundary between a periodic region and a non-periodic region, if the interpolation target pixel is located within the periodic region whereas patterns, which are present in the vicinity thereof and are located in the non-periodic region, are employed, it is difficult to perform interpolation properly. Thus, the boundary determining unit 67 determines the region to which the interpolation target pixel actually belongs so that the pixel value can be estimated using the proper patterns located in the periodic region.

As an example thereof, reference regions are set at positions around the interpolation target pixel so as to be separated by a predetermined distance to the left and right sides of the interpolation target pixel, and the variance of the pixel values, which is one of the image characteristics, of the reference regions set to the left and right sides of the interpolation target pixel is individually calculated. When the variance in both the left and right reference regions is equal to or larger than a threshold value, the interpolation target pixel can be determined to be in the periodic region. When the variance is smaller than the threshold value, the interpolation target pixel can be determined to be in the non-periodic region.

The predetermined distance may be 3 pixels, for example. This is because when halftone dots are arranged at intervals of 6 pixels, for example, a template made up of three pixels on the left and right sides of an interpolation target pixel is used in the pattern matching described later. Thus, the reference regions are set at the positions separated from the interpolation target pixel by 3 pixels on the left and right sides of the interpolation target pixel, which are the closest positions on the outer side of the template. The reason why the reference regions are set at those closest positions is because most patterns similar to the template are present in the vicinity of the template. The distance is not limited to 3 pixels, but any distance may be used if determination can be made appropriately.

The reference region may be a region having a height of 1 pixel including the interpolation target pixel, for example, namely one line of the image. Alternatively, the reference region may be a rectangular region having an optional height including the interpolation target pixel similarly to the determination region described above. This region may be set by the user in advance and may be dynamically set by the device similarly to the case of the determination region. The reference region is not limited to being located on the left and right sides of the interpolation target pixel, but one or more regions may be set, for example, on the upper and lower sides or the upper, lower, left, and right sides of the interpolation target pixel.

The variance can be calculated by Expression (4) below. In Expression (4), "$x_i$" is the pixel value of the i-th pixel in the reference region, "$x_m$" is the average value of the pixel values of the pixels in the reference region, and "n" is the number of pixels present in the reference region. The variance can be replaced with the difference between the maximum luminance value and the minimum luminance value of the pixels in the reference region, or in the case of color images, the difference between the maximum green component value (G component value) and the minimum G component value.

$$\sigma^2 = \frac{1}{n} \sum_{i=1}^{n} (x_i - x_m)^2 \qquad (4)$$

The control unit 63 determines an interpolation method based on the result of the determination by the boundary determining unit 65 as well as the result of the periodicity determination by the periodicity determining unit 60, determines which one of the first and second pixel value generating units 61 and 62 is to be employed, and causes the determined pixel value generating unit to generate a pixel value to be inserted to the interpolation target pixel. However, this may be realized by a parallel process such that the pixel value of the interpolation target pixel is generated in advance by both of the first and second pixel value generating units 61 and 62, and the control unit 63 selects one of the respective pixel values.

Figure 15:
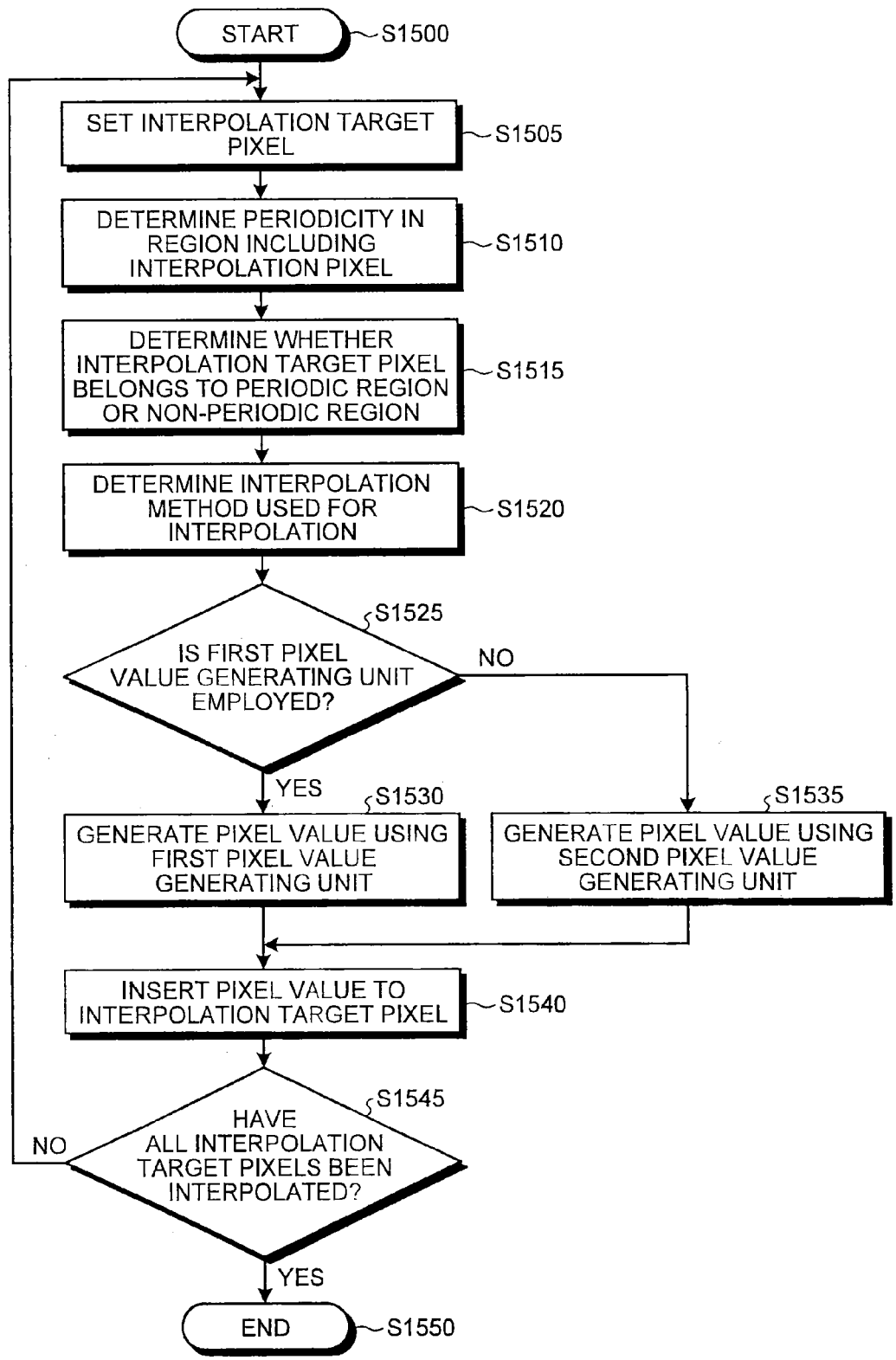
FIG. 15 is a flowchart illustrating the flow of a pixel interpolation process executed by the image processing apparatus illustrated in FIG. 14.

The process of correcting the pixel value of the interpolation target pixel using the image processing apparatus illustrated in FIG. 14 will be described with reference to the flowchart illustrated in FIG. 15. When this process starts from step S1500, first, in step S1505, the pixel specifying unit detects a pixel into which its pixel value is to be inserted and sets the pixel as an interpolation target pixel. This detection can be performed using the above-described method. When there is a plurality of interpolation target pixels, one pixel may be selected sequentially in the arrangement order based on the coordinate position at which the pixels are arranged, for example, and the selected pixel may be set as the interpolation target pixel.

In step S1510, the periodicity determining unit 60 designates a region including the interpolation target pixel and determines whether a variation of the pixel values within the region has periodicity. The determination region is designated using the method of determining the size of the region and the method of determining periodicity, and then the presence of periodicity is determined. Subsequently, in step S1515, it is determined whether the interpolation target pixel is actually present in a periodic region or a non-periodic region.

Subsequently, in step S1520, an interpolation method used for interpolation is determined. In this step, the control unit 63 determines which one of the interpolation methods employed by the first and second pixel value generating units 61 and 62 will be employed for generating the pixel value of the interpolation target pixel based on the determination results in steps S1510 and S1515. As described above, when the periodicity determining unit 60 determines that periodicity is present, the pattern matching method is determined. When the periodicity determining unit 60 determines that periodicity is not present, the interpolating method is determined to be used.

In step S1525, it is determined whether the first pixel value generating unit 61 is employed. When the interpolation method determined in step S1520 is the pattern matching method, the first pixel value generating unit 61 performing the interpolation process using the pattern matching method is determined to be employed. When the determined interpolation method is a method other than the pattern matching method, the first pixel value generating unit 61 is determined not to be employed.

When the first pixel value generating unit 61 is determined to be employed in step S1525, the flow proceeds to step S1530. In step S1530, a similar pattern is searched for by the pattern matching method used by the first pixel value generating unit 61, and the pixel value of the interpolation target pixel is generated based on the similar pattern thus searched for. On the other hand, when the first pixel value generating unit 61 is determined not to be employed in step S1525, the flow proceeds to step S1535. In step S1535, the pixel value of the interpolation target pixel is generated by the interpolation method used by the second pixel value generating unit 62, namely the interpolating method in this example.

Subsequently, in step S1540, the pixel value of the interpolation target pixel generated in step S1530 or S1535 is inserted to the interpolation target pixel set in step S1505. Since the interpolation target pixel does not have a pixel value or have an incorrect value if it has, a pixel value is set to the interpolation target pixel by inserting the generated pixel value to the interpolation target pixel. Then, the flow proceeds to step S1545, and it is determined whether all the interpolation target pixels have been completely interpolated. When a plurality of interpolation target pixels is detected in step S1505, it is determined whether all the plurality of interpolation target pixels have been interpolated with the generated pixel values.

When it is determined in step S1545 that all the interpolation target pixels have been completely interpolated, the flow proceeds to step S1550, and this process ends. On the other hand, when it is determined that all the interpolation target pixels have not been completely interpolated, the flow returns to step S1505. In step S1505, a process of setting the next interpolation target pixel, generating the pixel value, and inserting the generated pixel value is performed. In steps S1510 and S1530, the same processes as the processes illustrated in FIGS. 9, 11, 12, and 13 can be executed.

Figure 16:
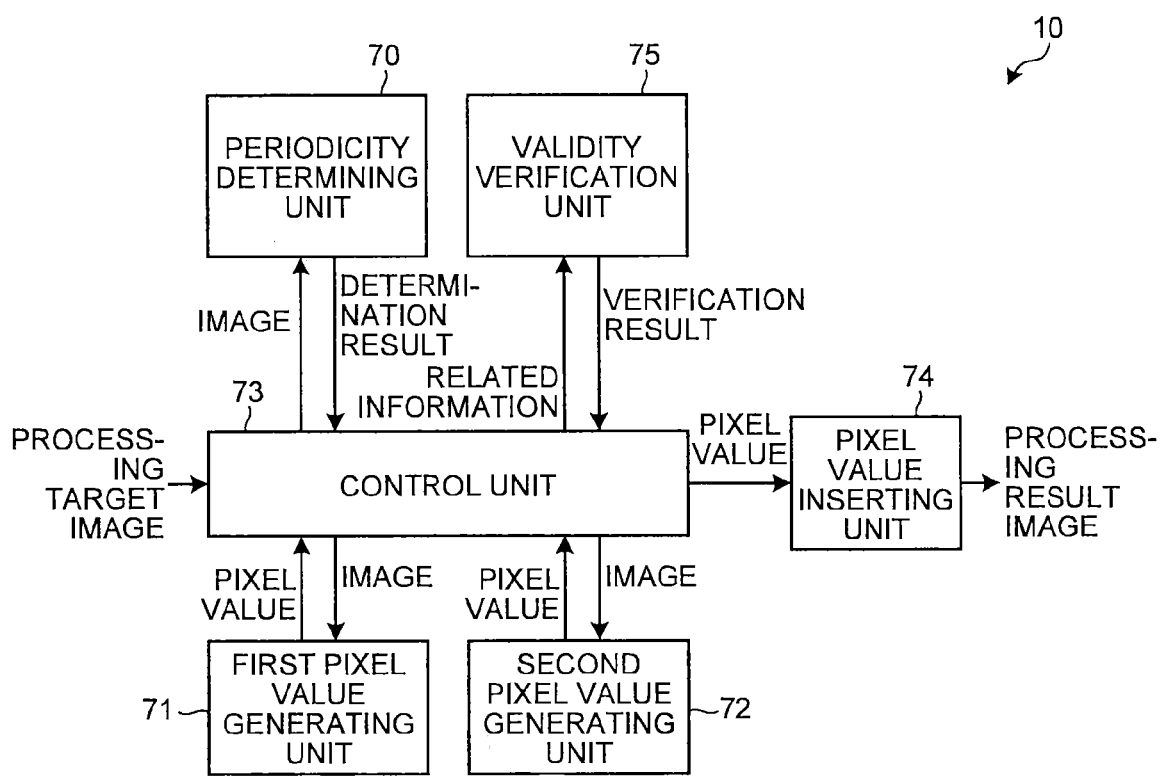
FIG. 16 is a functional block diagram illustrating a third embodiment of the image processing apparatus.

FIG. 16 is a functional block diagram illustrating a third embodiment of the image processing apparatus. In this embodiment, the image processing apparatus includes a periodicity determining unit 70, a first pixel value generating unit 71, a second pixel value generating unit 72, a control unit 73, and a pixel value inserting unit 74 which are the same as those of the first embodiment illustrated in FIG. 2. In addition, the image processing apparatus further includes a validity verification unit 75 configured to verify the validity of the pixel value of the interpolation target pixel generated by the first pixel value generating unit 71 or the second pixel value generating unit 72. Therefore, the control unit 73 causes the validity verification unit 75 to verify whether the pixel value generated when the first pixel value generating unit 71 is employed is valid. When the pixel value is determined not to be valid, the control unit 73 causes the second pixel value generating unit 72 to generate the pixel value of the interpolation target pixel.

Since the processes performed by the periodicity determining unit 70, the first pixel value generating unit 71, the second pixel value generating unit 72, the control unit 73, and the pixel value inserting unit 74 are the same as those of the first embodiment, the description thereof will not be provided herein. Thus, the validity verification unit 75 will be described. The validity verification unit 75 verifies whether the pixel value generated by the first pixel value generating unit 71, for example, is valid.

Verification of the validity can be performed using the related information obtained when the first pixel value generating unit 71 generates the pixel value. As the related information, when the first pixel value generating unit 71 uses a pattern matching method as the interpolation method, the degree of dissimilarity or the degree of similarity between the template and a comparison target pattern can be used. As the degree of dissimilarity or the degree of similarity, SAD, SSD, a correlation coefficient, covariance, and the like described above can be used.

The validity verification unit 75 can determine the validity by calculating the degree of dissimilarity or the degree of similarity between the optimum pattern which is a predetermined region within an image employed when the first pixel value generating unit 71 generates the pixel value using the pattern matching method as the first interpolation method and the base pattern including the interpolation target pixel. Then the validity verification unit 75 determines whether the degree of dissimilarity is smaller than a threshold value or the degree of similarity is equal to or larger than the threshold value. The pixel value is determined to be valid when the degree of dissimilarity is smaller than the threshold value, and the pixel value is determined to be valid when the degree of similarity is equal to or larger than the threshold value.

Thus, the validity verification unit 75 may perform threshold processing on the degree of dissimilarity or the degree of similarity, and a condition in which the degree of dissimilarity is smaller than the threshold value, or the degree of similarity is equal to or larger than the threshold value may be used as the condition for determining the validity. This threshold value may be set by the user in advance, and may be determined dynamically by the device, similarly to the above-described threshold value and the like.

In conjunction with this, the control unit 73 causes the validity verification unit 75 to verify whether the pixel value generated when the first pixel value generating unit 71 is employed is valid. When the pixel value is determined not to be valid, the control unit 73 causes the second pixel value generating unit 72 to generate a pixel value of the interpolation target pixel. However, the embodiment is not limited to this, and this may be realized by a parallel process such that the pixel value of the interpolation target pixel is generated in advance by both of the first and second pixel value generating units 71 and 72, and the control unit 73 selects one of the respective pixel values based on the result of the verification by the validity verification unit 75.

Figure 17:
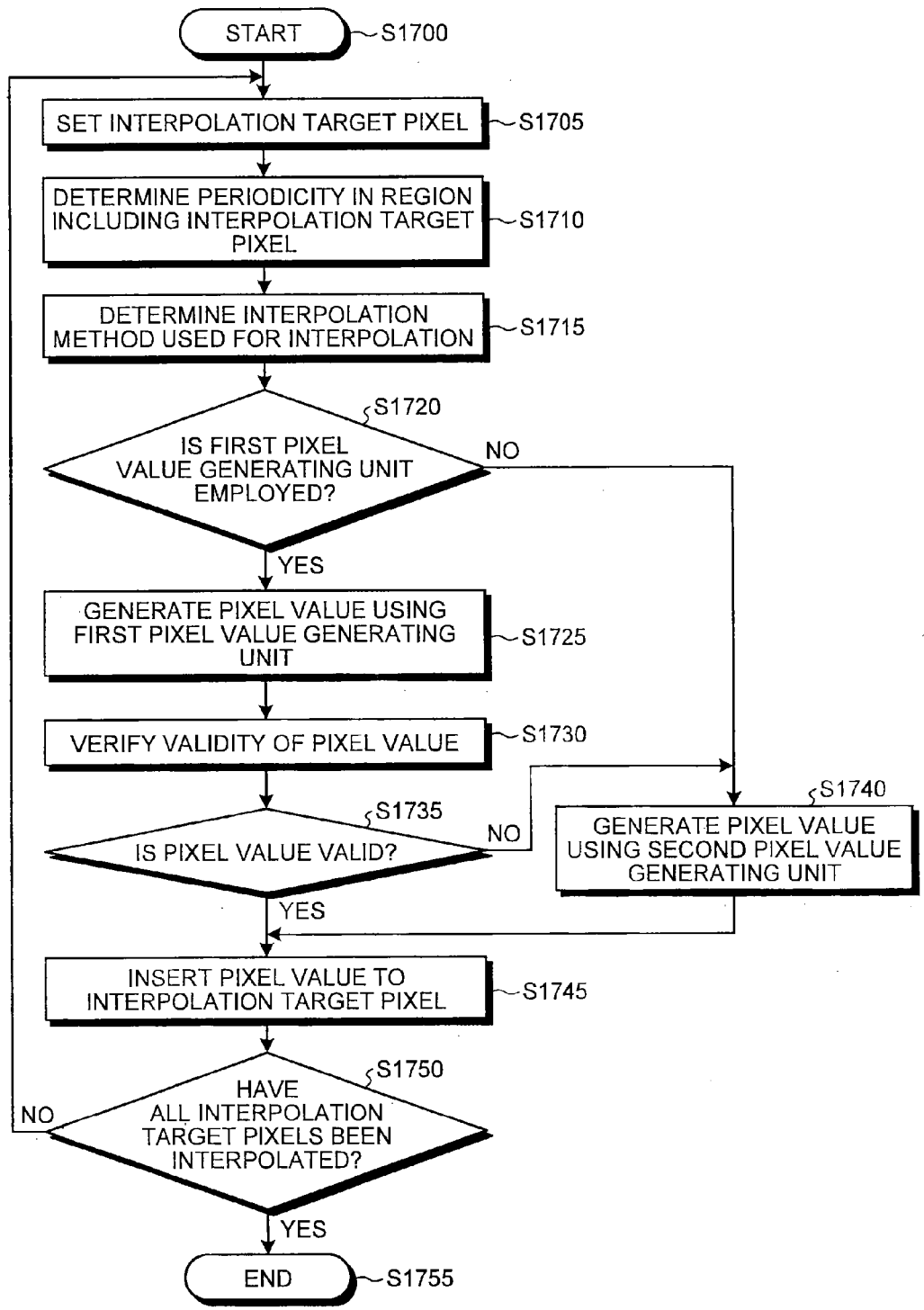
FIG. 17 is a flowchart illustrating the flow of a pixel interpolation process executed by the image processing apparatus illustrated in FIG. 16.

The process of correcting the pixel value of the interpolation target pixel using the image processing apparatus illustrated in FIG. 16 will be described with reference to the flowchart illustrated in FIG. 17. When this process starts from step S1700, first, in step S1705, a pixel specifying unit not illustrated in FIG. 16 detects a pixel whose pixel value is to be inserted and sets the pixel as an interpolation target pixel. This detection can be performed using the above-described method. When there is a plurality of interpolation target pixels, one pixel may be selected in the above-described manner.

In step S1710, the periodicity determining unit 70 determines whether a variation of the pixel values within a region including the interpolation target pixel has periodicity. The periodicity is determined using the method of determining the size of the region and the method of determining periodicity. Subsequently, in step S1715, an interpolation method used for interpolation is determined. In this step, the control unit 73 determines which one of the interpolation methods employed by the first pixel value generating unit 71 and the second pixel value generating unit 72 is to be used for generating the pixel value of the interpolation target pixel based on the determination result in step S1710. In step S1720, it is determined whether the first pixel value generating unit 71 is employed based on the determined interpolation method.

When the first pixel value generating unit 71 is determined to be employed in step S1720, the flow proceeds to step S1725. In step S1725, the pixel value of the interpolation target pixel is generated by the interpolation method used by the first pixel value generating unit 71, namely the pattern matching method in this example. Subsequently, in step S1730, the validity verification unit 75 verifies the validity of the pixel value generated by the first pixel value generating unit 71, and in step S1735, the validity of the pixel value is determined. The validity is determined using the related information obtained when generating the pixel value, specifically, the degree of dissimilarity or the degree of similarity. That is, it is determined whether the degree of dissimilarity is smaller than a threshold value, or the degree of similarity is equal to or larger than the threshold value.

When the first pixel value generating unit 71 is determined not to be employed in step S1720, the flow proceeds to step S1740. In step S1740, the pixel value of the interpolation target pixel is generated by the interpolation method used by the second pixel value generating unit 72, namely the interpolating method in this example. Moreover, when the pixel value is determined not to be valid in step S1735, the flow proceeds to step S1740, and the pixel value of the interpolation target pixel is generated by the interpolation method used by the second pixel value generating unit 72.

When the pixel value is determined to be valid in step S1735, or after the pixel value of the interpolation target pixel is generated by the second pixel value generating unit 72 in step S1740, the flow proceeds to step S1745, and the pixel value is inserted to the interpolation target pixel detected in step S1705. In this way, the generated pixel value is set as the pixel value of the interpolation target pixel. Then, the flow proceeds to step S1750, and it is determined whether all the interpolation target pixels have been completely interpolated. When a plurality of interpolation target pixels is set in step S1705, it is determined whether all the plurality of interpolation target pixels have been interpolated with the generated pixel values.

When it is determined in step S1750 that all the interpolation target pixels have been completely interpolated, the flow proceeds to step S1755, and this process ends. On the other hand, when it is determined that all the interpolation target pixels have not been completely interpolated, the flow returns to step S1705. In step S1705, a process of setting the next interpolation target pixel, generating the pixel value, and inserting the pixel value is performed.

Figure 18:
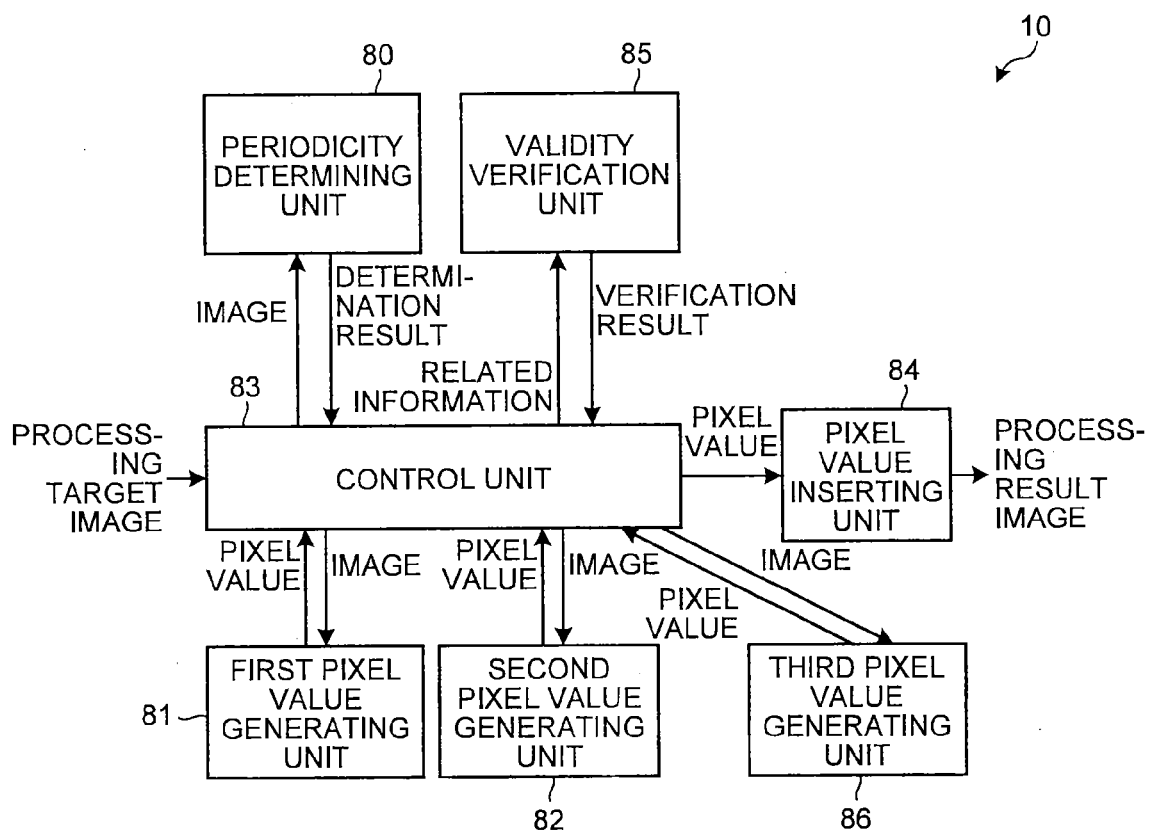
FIG. 18 is a functional block diagram illustrating a fourth embodiment of the image processing apparatus.

FIG. 18 is a functional block diagram illustrating a fourth embodiment of the image processing apparatus. In this embodiment, the image processing apparatus includes a periodicity determining unit 80, a first pixel value generating unit 81, a second pixel value generating unit 82, a control unit 83, a pixel value inserting unit 84, and a validity verification unit 85 which are the same as those of the third embodiment illustrated in FIG. 16. In addition, the image processing apparatus further includes a third pixel value generating unit 86 configured to generate the pixel value of an interpolation target pixel using a method different from the interpolation methods employed by the first pixel value generating unit 81 and the second pixel value generating unit 82. Therefore, the control unit 83 causes the validity verification unit 85 to verify whether the pixel value generated when the first pixel value generating unit 81 is employed is valid. When the pixel value is determined not to be valid, the control unit 83 causes the third pixel value generating unit 86 to generate the pixel value of the interpolation target pixel and causes the validity verification unit 85 to verify the pixel value. When this pixel value is determined not to be valid, the control unit 83 causes the second pixel value generating unit 82 to generate the pixel value of the interpolation target pixel.

In the fourth embodiment, although only the third pixel value generating unit 86 is added to the configuration of the third embodiment illustrated in FIG. 16, the present invention is not limited to this. A fourth pixel value generating unit, a fifth pixel value generating unit, and the like may be further added so that four or more pixel value generating units are included. In this case, the control unit 83 determines the validity of the pixel value generated by one of the respective pixel value generating units, and when the pixel value is determined not to be valid, the control unit 83 may cause another pixel value generating unit to generate the pixel value.

The processes performed by the periodicity determining unit 80, the first pixel value generating unit 81, the second pixel value generating unit 82, the control unit 83, the pixel value inserting unit 84, and the validity verification unit 85 in the fourth embodiment are the same as those of the third embodiment. Moreover, the third pixel value generating unit 86 is also configured to generate the pixel value of the interpolation target pixel similarly to the first and second pixel value generating units 81 and 82 using a different interpolation method. Therefore, the description of the configuration thereof will not be provided herein.

The control unit 83 causes the validity verification unit 85 to verify whether the pixel value generated when the first pixel value generating unit 81 is employed is valid. When the pixel value is determined not to be valid, the control unit 83 causes the third pixel value generating unit 86 to generate the pixel value of the interpolation target pixel. Then, the control unit 83 causes the validity verification unit 85 to verify whether the generated pixel value is valid. When the pixel value is determined not to be valid, the control unit 83 causes the second pixel value generating unit 82 to generate the pixel value of the interpolation target pixel. However, the embodiment is not limited to this, and this may be realized by a parallel process such that the pixel value of the interpolation target pixel is generated in advance by all of the first, second, and third pixel value generating units 81, 82, and 86, and the control unit 83 selects one of the respective pixel values based on the result of the verification by the validity verification unit 85.

The third pixel value generating unit 86 uses an interpolation method different from those used by the first and second pixel value generating units 81 and 82. For example, when the first pixel value generating unit 81 uses two-dimensional template matching, and the second pixel value generating unit 82 employs linear interpolation, the third pixel value generating unit 86 may employ one-dimensional template matching, parabolic interpolation, cubic interpolation, polynomial interpolation, spline interpolation, or the like other than the above interpolation methods.

Figure 19:
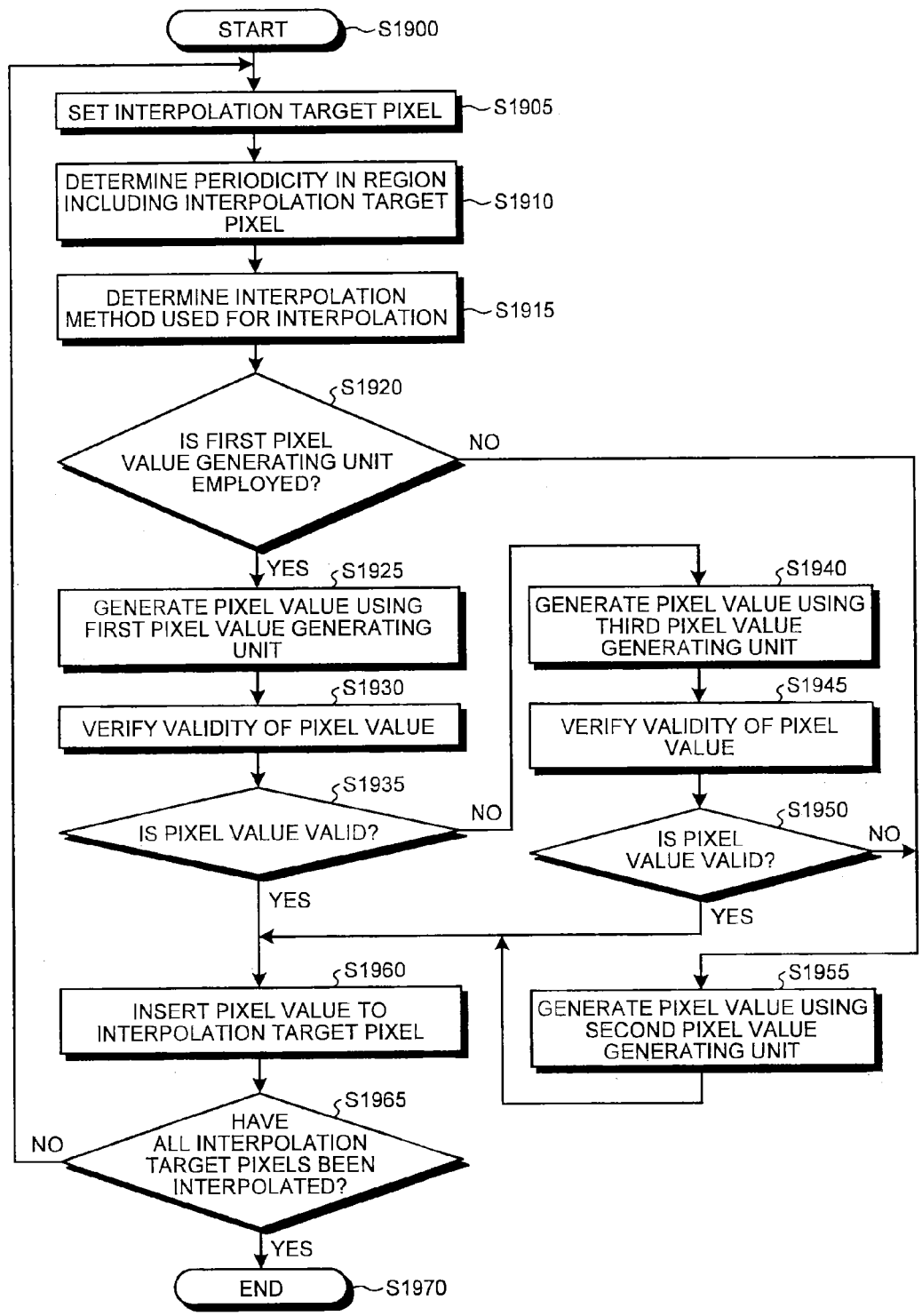
FIG. 19 is a flowchart illustrating the flow of a pixel interpolation process executed by the image processing apparatus illustrated in FIG. 18.

The process of correcting the pixel value of the interpolation target pixel using the image processing apparatus illustrated in FIG. 18 will be described with reference to the flowchart illustrated in FIG. 19. When this process starts from step S1900, first, in step S1905, a pixel specifying unit not illustrated in FIG. 18 detects a pixel into which its pixel value is to be inserted and sets the pixel as an interpolation target pixel. This detection can be performed using the above-described method. When there is a plurality of interpolation target pixels, one pixel may be selected in the above-described manner.

In step S1910, it is determined whether a variation of the pixel values within a region including the interpolation target pixel has periodicity. The periodicity is determined using the method of determining the size of the region and the method of determining periodicity. Subsequently, in step S1915, an interpolation method used for interpolation is determined. In this step, the control unit 83 determines which one of the interpolation methods employed by the first, second, and third pixel value generating units 81, 82, and 86 to be used for generating the pixel value of the interpolation target pixel based on the determination result in step S1910. In step S1920, it is determined whether the first pixel value generating unit 81 is employed based on the determined interpolation method.

When the first pixel value generating unit 81 is determined to be employed in step S1920, the flow proceeds to step S1925. In step S1925, the pixel value of the interpolation target pixel is generated by the interpolation method used by the first pixel value generating unit 81. Subsequently, in step S1930, the validity verification unit 85 verifies the validity of the pixel value generated by the first pixel value generating unit 81, and in step S1935, the validity of the pixel value is determined.

The validity is determined using the related information obtained when the first pixel value generating unit 81 generates the pixel value. When the interpolation method employed by the first pixel value generating unit 81 is a pattern matching method, the degree of dissimilarity or the degree of similarity between the template and the optimum pattern used for generating the pixel value can be used as the related information. The pixel value is determined to be valid when the degree of dissimilarity is smaller than a threshold value or the degree of similarity is equal to or larger than the threshold value. In this case, as the template, a template excluding the interpolation target pixel may be used, and a template in which the generated pixel value is inserted may be used.

Moreover, when it is determined in step S1935 that the pixel value is not valid, the flow proceeds to step S1940, and the pixel value of the interpolation target pixel is generated by the interpolation method used by the third pixel value generating unit 86. Subsequently, in step S1945, the validity verification unit 85 verifies the validity of the pixel value generated by the third pixel value generating unit 86, and in step S1950, the validity of the pixel value is determined.

When the first pixel value generating unit 81 is determined not to be employed in step S1920, or the pixel value is determined not to be valid in step S1950, the flow proceeds to step S1955. In step S1955, the pixel value of the interpolation target pixel is generated by the interpolation method used by the second pixel value generating unit 82.

When the pixel value is determined to be valid in step S1935, or the pixel value is determined to be valid in step S1950, or after the pixel value is generated in step S1955, the flow proceeds to step S1960, and the pixel value is inserted to the interpolation target pixel detected in step S1905. Then, the flow proceeds to step S1965, and it is determined whether all the interpolation target pixels have been completely interpolated. When a plurality of interpolation target pixels is detected in step S1905, it is determined whether all the plurality of interpolation target pixels have been interpolated with the generated pixel values.

When it is determined in step S1965 that all the interpolation target pixels have been completely interpolated, the flow proceeds to step S1970, and this process ends. On the other hand, when it is determined that all the interpolation target pixels have not been completely interpolated, the flow returns to step S1905. In step S1905, a process of setting the next interpolation target pixel, generating the pixel value, and inserting the pixel value is performed.

Figure 20:
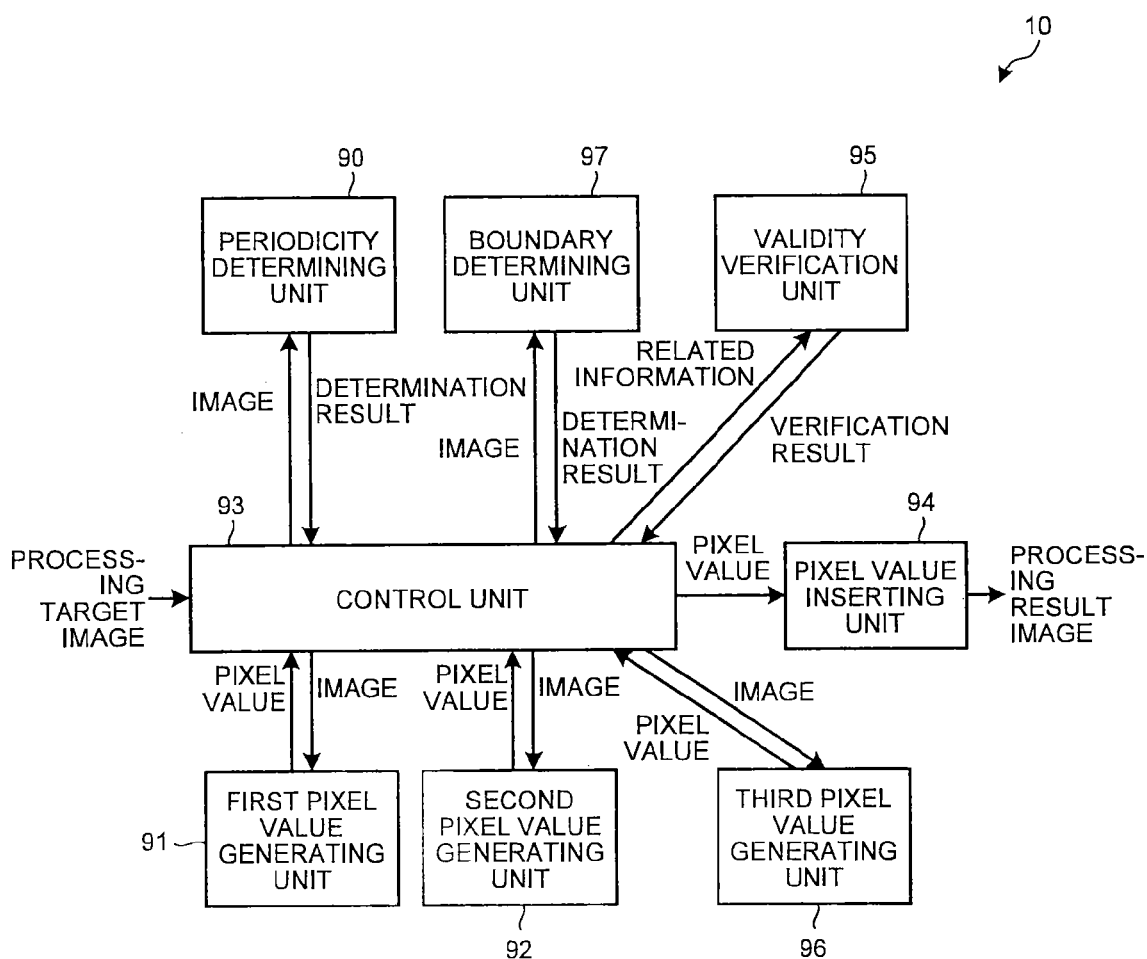
FIG. 20 is a functional block diagram illustrating a fifth embodiment of the image processing apparatus.

FIG. 20 is a functional block diagram illustrating a fifth embodiment of the image processing apparatus. In the fifth embodiment, the image processing apparatus includes a periodicity determining unit 90, a first pixel value generating unit 91, a second pixel value generating unit 92, a control unit 93, a pixel value inserting unit 94, a validity verification unit 95, and a third pixel value generating unit 96 which are the same as those of the fourth embodiment illustrated in FIG. 18. In addition, the image processing apparatus further includes a boundary determining unit 97 employed in the second embodiment. Therefore, the control unit 93 switches among the first, second, and third pixel value generating units 91, 92, and 96 based on the determination result of the boundary determining unit 97 as well as the determination result of the periodicity determining unit 90.

As an example of a method of determining the interpolation method, when periodicity is present in the region including an interpolation target pixel, and the interpolation target pixel is within a periodic region, the first pixel value generating unit 91 is employed. When periodicity is present in the region including the interpolation target pixel, and the interpolation target pixel is within a non-periodic region, the second pixel value generating unit 92 is employed. When periodicity is not present in the region including the interpolation target pixel, the third pixel value generating unit 96 is employed.

In addition to this, when the cycle in the region including the interpolation target pixel is short and the interpolation target pixel is within the periodic region, the first pixel value generating unit 91 may be employed. When the cycle in the region including the interpolation target pixel is short, and the interpolation target pixel is within the non-periodic region, the second pixel value generating unit 92 may be employed. In other cases, the third pixel value generating unit 96 may be employed.

In this embodiment, when the first pixel value generating unit 91 is employed, the validity verification unit 95 verifies the validity of the pixel value generated by the first pixel value generating unit 91. When the first pixel value generating unit 91 is not employed, it is determined whether the third pixel value generating unit 96 is employed. When the third pixel value generating unit 96 is employed, the third pixel value generating unit 96 generates the pixel value of the interpolation target pixel, and the validity verification unit 95 verifies the validity of the generated pixel value. When the third pixel value generating unit 96 is not employed, the second pixel value generating unit 92 generates the pixel value of the interpolation target pixel. However, the embodiment is not limited to this, and this may be realized by a parallel process such that the pixel value is generated in advance by all of the first, second, and third pixel value generating units 91, 92, and 96, and one of the respective pixel values is selected based on the result of the verification by the validity verification unit 95.

Figure 21:
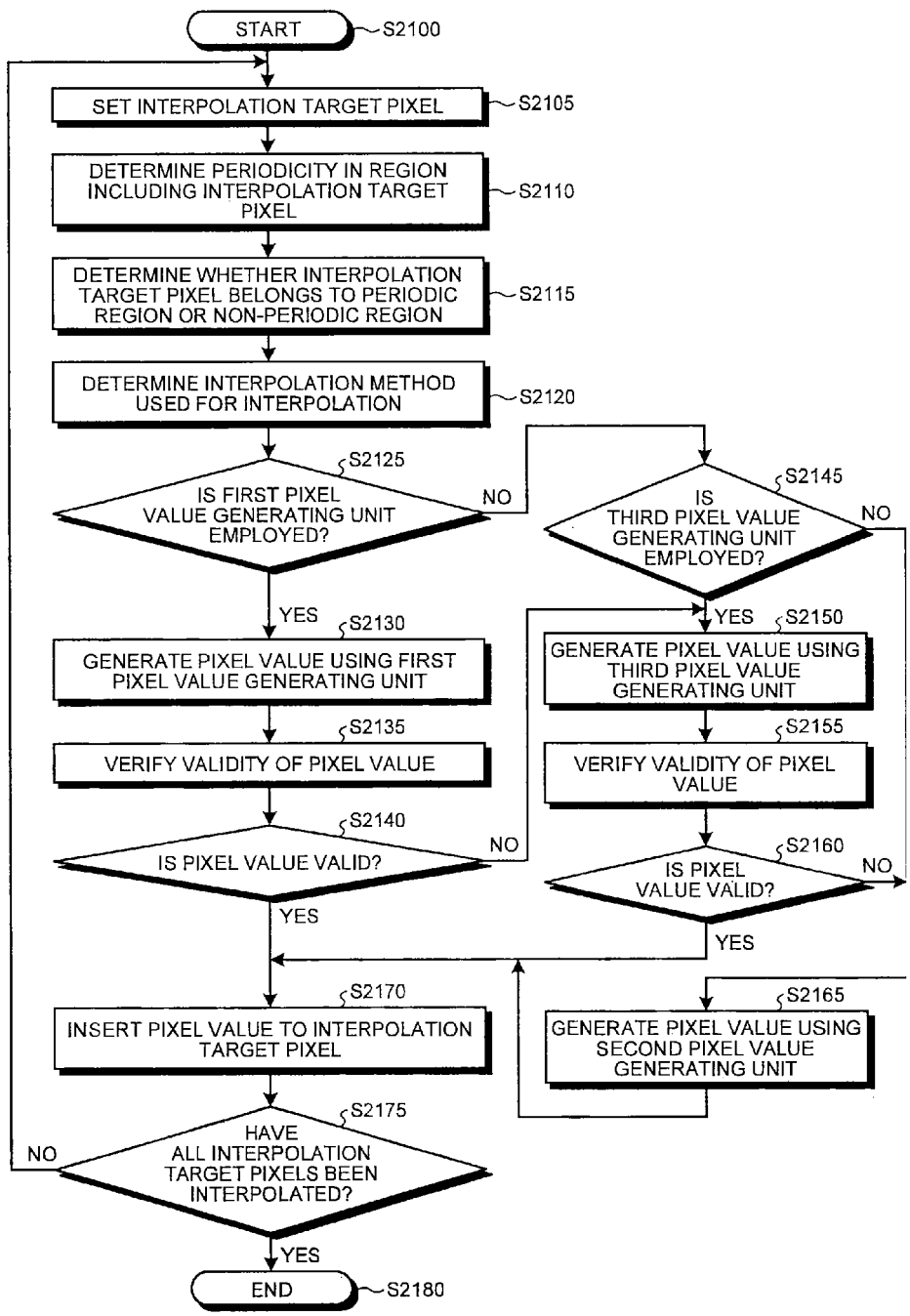
FIG. 21 is a flowchart illustrating the flow of a pixel interpolation process executed by the image processing apparatus illustrated in FIG. 20.

The process of correcting the pixel value of the interpolation target pixel using the image processing apparatus illustrated in FIG. 20 will be described with reference to the flowchart illustrated in FIG. 21. When this process starts from step S2100, first, in step S2105, a pixel to which the pixel value is to be inserted is detected, and the pixel is set as an interpolation target pixel. This detection can be performed using the above-described method. When there is a plurality of interpolation target pixels, one pixel may be selected in the above-described manner.

In step S2110, the periodicity determining unit 90 designates a region including the interpolation target pixel and determines whether a variation of the pixel values within the region has periodicity. The periodicity is determined using the method of determining the size of the region and the method of determining periodicity. Subsequently, in step S2115, the boundary determining unit 97 determines whether the interpolation target pixel is actually present in a periodic region or a non-periodic region. In this determination, the boundary determination method and the method of determining the reference region size are employed. The determination is performed by calculating the variance of the pixel values in each of the left and right reference regions and determining whether the calculated variance in each of the left and right reference regions is equal to or larger than the threshold value. When both variances are equal to or larger than the threshold value, the interpolation target pixel is determined to be present in the periodic region.

Subsequently, in step S2120, an interpolation method used for interpolation is determined. In this step, the control unit 93 determines which one of the interpolation methods employed by the first, second, and third pixel value generating units 91, 92, and 96 will be employed for generating the pixel value of the interpolation target pixel based on the determination results in steps S2110 and S2115. Subsequently, in step S2125, it is determined whether the first pixel value generating unit 91 will be employed based on the determined interpolation method.

When the first pixel value generating unit 91 is determined to be employed in step S2125, the flow proceeds to step S2130. In step S2130, the pixel value of the interpolation target pixel is generated by the interpolation method used by the first pixel value generating unit 91. Subsequently, in step S2135, the validity verification unit 95 verifies the validity of the pixel value generated by the first pixel value generating unit 91, and in step S2140, the validity of the pixel value is determined.

When it is determined in step S2125 that the first pixel value generating unit 91 is not employed, the flow proceeds to step S2145, and it is determined whether the third pixel value generating unit 96 is employed. When it is determined that the third pixel value generating unit 96 is employed, and it is determined in step S2140 that the pixel value is not valid, the flow proceeds to step S2150, and the pixel value of the interpolation target pixel is generated by the interpolation method used by the third pixel value generating unit 96. Subsequently, in step S2155, the validity verification unit 95 verifies the validity of the pixel value generated by the third pixel value generating unit 96. In step S2160, the validity of the pixel value is determined.

When it is determined in step S2145 that the third pixel value generating unit 96 is not employed, the flow proceeds to step S2165, and the pixel value of the interpolation target pixel is generated by the interpolation method used by the second pixel value generating unit 92. Moreover, when it is determined in step S2160 that the pixel value is not valid, the flow proceeds to step S2165, and the pixel value of the interpolation target pixel is generated by the interpolation method used by the second pixel value generating unit 92.

When the pixel value is determined to be valid in step S2140, and the pixel value is determined to be valid in step S2160, and after the pixel value is generated in step S2165, the flow proceeds to step S2170, and the pixel value is inserted to the interpolation target pixel set in step S2105. Then, the flow proceeds to step S2175, and it is determined whether all the interpolation target pixels have been completely interpolated. When a plurality of interpolation target pixels is detected in step S2105, it is determined whether all the plurality of interpolation target pixels have been interpolated with the generated pixel values.

When it is determined in step S2175 that all the interpolation target pixels have been completely interpolated, the flow proceeds to step S2180, and this process ends. On the other hand, when it is determined that all the interpolation target pixels have not been completely interpolated, the flow returns to step S2105. In step S2105, a process of setting the next interpolation target pixel, generating the pixel value, and inserting the generated pixel value is performed.

According to at least one embodiment described above, the cycle estimating unit estimates the periodicity from the pixel value, or the partial region periodicity determining unit determines whether the interpolation target pixel is included in the periodic region. When the interpolation target pixel is determined to be present in the periodic region based one at least one of these results, the size of a template used for pattern matching is dynamically set in accordance with the characteristics of the image to restrict the information used for searching for a similar pattern. In this way, the similar pattern optimal to the template including the interpolation target pixel may be searched for and retrieved from the image. As a result, an appropriate pixel value of the interpolation target pixel can be obtained.

However, there is a case in which periodicity is present in a large image region such as one line image but is not present in a narrow image region in the vicinity of the interpolation target pixel. In such a case, erroneous determination of periodicity may occur by a determination criterion. For example, erroneous determination likely occurs in a non-halftone dot region in the vicinity of a halftone dot region or a non-halftone dot region interposed between two halftone dot regions. When erroneous determination occurs, a flat region on the outer side of a halftone dot region may be interpolated as a halftone dot region, and an incorrect pixel value appears as the result of interpolation. Thus, as described above, the apparatus further includes a boundary determining unit configured to set at least one reference region in the vicinity of the interpolation target pixel when the image region is determined to be a periodic region and determine whether the interpolation target pixel is present in the periodic region or the non-periodic region based on the image characteristics of the at least one reference region.

In addition to the image processing apparatus and an image inspection method executed by the image processing apparatus, the present invention can provide a computer-readable program for realizing the method. The program may be stored in a recording medium such as an FD, a CD, a DVD, an SD card, a USB memory, or the like and provided as a recording medium having the program recorded therein.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Therefore, the validity verification unit may be included in the configuration of the second embodiment, and the boundary determining unit may be included in the configuration of the third embodiment. That is, the image processing apparatus may be configured to include the periodicity determining unit, the boundary determining unit, the first pixel value generating unit, the second pixel value generating unit, the control unit, the pixel value inserting unit, and the validity verification unit. Moreover, the boundary determining unit may be included to the configuration of the fourth embodiment in place of the validity verification unit. That is, the image processing apparatus may be configured to include the periodicity determining unit, the boundary determining unit, the first pixel value generating unit, the second pixel value generating unit, the third pixel value generating unit, the control unit, and the pixel value inserting unit.

What is claimed is:

1. An image processing apparatus comprising:
 a periodicity determining unit to determine whether an image region including a target pixel whose pixel value is to be interpolated is a periodic region in which pixel values vary periodically;
 a first pixel value generating unit to generate a pixel value of a pixel using a first interpolation method;
 a second pixel value generating unit to generate a pixel value of a pixel using a second interpolation method different from the first interpolation method;
 a control unit to determine, based on the determination result obtained by the periodicity determining unit, which one of the first and second pixel value generating units is to be used for generating a pixel value of the target pixel; and a pixel value inserting unit to insert, to the target pixel, the pixel value generated by one of the first and second pixel value generating units determined by the control unit,
wherein the periodicity determining unit includes
   a cycle estimating unit to estimate, using pixel values of respective pixels within the image region including the target pixel, a variation cycle of the pixel values,
wherein at least one of the first and second pixel value generating units generates the pixel value of the target pixel using the variation cycle of the pixel values estimated by the cycle estimating unit, and
wherein the first pixel value generating unit determines a size of a template used in a pattern matching method, based on the variation cycle of the pixel values estimated by the cycle estimating unit.

2. The image processing apparatus according to claim 1, wherein the first interpolation method is the pattern matching method.

3. The image processing apparatus according to claim 1, further comprising:
a boundary determining unit to set, as a reference region, at least one region in vicinity of the target pixel when the image region including the target pixel is determined to be the periodic region by the periodicity determining unit and to determine, based on image characteristics of the at least one reference region, whether the target pixel is present in the periodic region or a non-periodic region other than the periodic region,
wherein the control unit determines, based on the determination results obtained by the periodicity determining unit and the boundary determining unit, which one of the first and second pixel value generating units is to be used for generating the target pixel value.

4. The image processing apparatus according to claim 1, further comprising:
a validity verification unit to verify validity of a result of the interpolation of the generated pixel value of the target pixel,
wherein, when the validity verification unit determines that a result of the interpolation of the pixel value of the target pixel generated by the first pixel value generating unit is invalid, the control unit causes the second pixel value generating unit instead of the first pixel value generating unit to generate the pixel value of the target pixel.

5. The image processing apparatus according to claim 4, wherein the validity verification unit determines the validity of the result of the interpolation by determining whether a degree of dissimilarity between a first pattern that is a predetermined image region employed when the first pixel value generating unit generates the pixel value using a pattern matching method as the first interpolation method and a base pattern including the target pixel is smaller than a threshold value or by determining whether a degree of similarity between the first pattern and the base pattern is equal to or larger than a threshold value.

6. The image processing apparatus according to claim 4, further comprising:
a third pixel value generating unit to generate a pixel value of the target pixel using a third interpolation method different from the first and second interpolation methods,
wherein when the validity verification unit determines that the validity of the result of the interpolation of the pixel value of the target pixel generated by the first pixel value generating unit is invalid, the control unit causes the third pixel value generating unit instead of the first pixel value generating unit to generate the pixel value of the target pixel.

7. The image processing apparatus according to claim 6, wherein when the validity verification unit determines that a result of interpolation of the pixel value of the target pixel generated by the third pixel value generating unit is invalid, the control unit causes the second pixel value generating unit instead of the third pixel value generating unit to generate the pixel value of the target pixel.

8. The image processing apparatus according to claim 6, wherein the first interpolation method is a two-dimensional template matching method, the second interpolation method is an interpolating method, and the third interpolation method is a one-dimensional template matching method.

9. The image processing apparatus according to claim 1, further comprising:
a boundary determining unit to determine whether the target pixel belongs to the periodic region or a non-periodic region other than the periodic region when the target pixel is present at a position in the vicinity of a boundary between the periodic region and the non-periodic region; and
a third pixel value generating unit to generate a pixel value of the target pixel using a third interpolation method different from the first and second interpolation methods,
wherein the control unit determines, based on the determination results obtained by the periodicity determining unit and the boundary determining unit, which one of the first, second, and third pixel value generating units is to be used for generating the pixel value of the target pixel.

10. A pixel interpolation method performed in an image processing apparatus that includes a first pixel value generating unit to generate a pixel value of a pixel using a first interpolation method, and a second pixel value generating unit to generate a pixel value of a pixel using a second interpolation method different from the first interpolation method, the pixel interpolation method comprising:
determining whether an image region including a target pixel whose pixel value is to be interpolated is a periodic region in which pixel values vary periodically;
determining, based on the determination result obtained in the determining of periodicity of the image region, which one of the first and second pixel value generating units is to be used for generating a pixel value of the target pixel;
inserting, to the target pixel, the pixel value generated by one of the first and second pixel value generating units determined in the determining of the pixel value generating unit,
wherein the determining of periodicity includes
   estimating, using pixel values of respective pixels within the image region including the target pixel, a variation cycle of the pixel values;
causing at least one of the first and second pixel value generating units to generate the pixel value of the target pixel using the variation cycle of the pixel values estimated in the estimating; and
determining a size of a template used in a pattern matching method, based on the variation cycle of the pixel values estimated in the estimating.

11. The pixel interpolation method according to claim 10, wherein the first interpolation method is the pattern matching method.

12. The pixel interpolation method according to claim 11, further comprising determining, by the first pixel value generating unit, an image region to be searched in order to retrieve a pattern similar to the template used in the pattern matching method, based on the determination result determined in the determining of the periodicity of each of the regions.

\* \* \* \* \*